US011671202B2

(12) United States Patent
Ali et al.

(10) Patent No.: US 11,671,202 B2
(45) Date of Patent: Jun. 6, 2023

(54) TECHNIQUES FOR CONTROLLING HYBRID AUTOMATIC REPEAT REQUEST (HARQ)

(71) Applicant: QUALCOMM incorporated, San Diego, CA (US)

(72) Inventors: Ahmed Omar Desouky Ali, San Jose, CA (US); Brian Clarke Banister, San Diego, CA (US); Supratik Bhattacharjee, San Diego, CA (US); Udayan Murli Bhawnani, San Diego, CA (US); Jittra Jootar, San Diego, CA (US); Timothy Paul Pals, San Diego, CA (US); Rebecca Wen-Ling Yuan, San Diego, CA (US); Arvind Vardarajan Santhanam, San Diego, CA (US); Zhibin Dang, San Diego, CA (US); Omesh Kumar Handa, San Marcos, CA (US); Sibasish Das, San Diego, CA (US); Chetan Jagdeesh Bharadwaj, Erie, CO (US); Gautham Hariharan, Cupertino, CA (US); Min Wang, San Diego, CA (US); Farrukh Rashid, San Diego, CA (US); Nan Zhang, San Diego, CA (US); Sumanth Kumar Kota, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 215 days.

(21) Appl. No.: 17/108,667

(22) Filed: Dec. 1, 2020

(65) Prior Publication Data
US 2021/0176013 A1 Jun. 10, 2021

Related U.S. Application Data

(60) Provisional application No. 62/946,126, filed on Dec. 10, 2019.

(51) Int. Cl.
H04L 1/18 (2023.01)
H04W 72/12 (2023.01)
(Continued)

(52) U.S. Cl.
CPC .......... *H04L 1/1812* (2013.01); *H04L 1/1861* (2013.01); *H04W 72/1268* (2013.01)

(58) Field of Classification Search
CPC ... H04W 28/04; H04W 72/04; H04W 72/042; H04W 88/08; H04W 72/1268; H04L 5/0007; H04L 1/1812; H04L 1/1861
(Continued)

(56) References Cited

U.S. PATENT DOCUMENTS 8,867,466 B2 * 10/2014 Jang ................. H04W 72/0453
370/252
9,408,104 B1 * 8/2016 Vivanco ................. H04L 47/20
(Continued)

FOREIGN PATENT DOCUMENTS

EP 3391571 A1 10/2018
WO WO-2017106006 A1 6/2017

OTHER PUBLICATIONS

3GPP TSG RAN WG1 Meeting #98, Prague, CZ, Aug. 26-30, 2019, R1-1908256, Source: ZTE, Title: Support for transmission in preconfigured UL resources for MTC, Agenda Item: 6.2.1.2. (Year: 2019).*
(Continued)

Primary Examiner — Mohammad S Anwar
Assistant Examiner — Sanjay K Dewan
(74) Attorney, Agent, or Firm — Dalei Dong; Holland & Hart LLP

(57) ABSTRACT

Methods, systems, and devices for wireless communications are described. A user equipment (UE) may adaptively switch between hybrid automatic repeat request (HARQ) monitor-
(Continued)

ing modes to support power savings. In a first HARQ skipping mode, the UE may transmit an uplink message corresponding to a HARQ identifier and may receive a positive acknowledgment (ACK) message in a HARQ monitoring occasion associated with the HARQ identifier. Upon receiving the ACK message, the UE refrains from monitoring a subsequent HARQ monitoring occasion associated with the HARQ identifier while in the first HARQ skipping mode (e.g., an aggressive HARQ skipping mode). The UE may periodically enter a periodic evaluation mode from the first HARQ skipping mode, in which the UE monitors a subsequent HARQ monitoring occasion after receiving an ACK message to check for false ACK messages. If a false ACK message is detected, the UE enters a first HARQ skipping prohibited mode.

28 Claims, 12 Drawing Sheets

(51) Int. Cl.
*H04L 1/1812* (2023.01)
*H04W 72/1268* (2023.01)
*H04L 1/1829* (2023.01)

(58) Field of Classification Search
USPC .......................................................... 370/329
See application file for complete search history.

(56) References Cited

U.S. PATENT DOCUMENTS

| | | |
|---|---|---|
| 10,079,657 B2 | 9/2018 | Balasubramanian et al. |
| 2012/0002635 A1* | 1/2012 | Chung ................ H04W 72/042 370/329 |
| 2014/0126544 A1* | 5/2014 | Khay-Lbbat .......... H04W 36/30 370/332 |
| 2015/0016430 A1* | 1/2015 | Yuan ..................... H04L 1/1887 370/336 |
| 2015/0334769 A1* | 11/2015 | Kim ...................... H04L 1/1864 370/329 |
| 2016/0285591 A1* | 9/2016 | Dortmund ............. H04L 1/1877 |
| 2017/0359780 A1* | 12/2017 | Ji .......................... H04W 76/28 |

OTHER PUBLICATIONS

International Search Report and Written Opinion—PCT/US2020/062842—ISA/EPO—dated Mar. 19, 2021.
ZTE: "Support for Transmission in Preconfigured UL Resources for MTC", 3GPP Draft, 3GPP TSG RAN WG1 Meeting #98, R1-1908256 PUR for EMTC-V2, 3rd Generation Partnership Project (3GPP), Mobile Competence Centre, 650, Route Des Lucioles, F-06921 Sophia-Antipolis Cedex, France, vol. RAN WG1. No. Prague. CZ, Aug. 26, 2019-Aug. 30, 20190, Aug. 17, 2019 (Aug. 17, 2019), XP051764870, 14 Pages, Retrieved from the Internet:URL:http://www.3gpp.org/ftp/tsg_ran/WG1_RL1/TSGR1_98/Docs/R1-1908256.zip, [retrieved on Aug. 17, 2019] paragraph [02.1]—paragraph [02.8].

* cited by examiner

TECHNIQUES FOR CONTROLLING HYBRID AUTOMATIC REPEAT REQUEST (HARQ)

CROSS REFERENCE

The present application for patent claims the benefit of U.S. Provisional Patent Application No. 62/946,126 by ALI et al., entitled "TECHNIQUES FOR CONTROLLING HYBRID AUTOMATIC REPEAT REQUEST (HARQ)," filed Dec. 10, 2019, assigned to the assignee hereof, which is hereby incorporated by reference in its entirety.

FIELD OF DISCLOSURE

The present disclosure, for example, relates to wireless communications systems, more specifically to techniques for controlling hybrid automatic repeat request (HARQ).

DESCRIPTION OF RELATED ART

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may support hybrid automatic repeat request (HARQ) monitoring during various occasions while operating according to connected mode discontinuous reception (CDRX). In one example, the UE may transmit an uplink message and may monitor for possible uplink retransmission grants or HARQ messages during a HARQ monitoring occasion following transmission of the uplink message. If the UE receives a HARQ positive acknowledgment (ACK) message from a base station in the HARQ monitoring occasion, the UE may continue to monitor for retransmission grants in one or more subsequent HARQ monitoring occasions (e.g., after receiving the HARQ ACK message) in case the received HARQ ACK message does not indicate successful reception of the uplink message at the base station (e.g., if the base station transmits the HARQ ACK message due to a heavy volume of traffic at the base station). Continued monitoring of the one or more subsequent HARQ monitoring occasions by the UE may result in a significant power overhead. Not monitoring the one or more subsequent HARQ monitoring occasions, however, may cause the UE to incur significant signaling latency, and the UE may fail to adapt to dynamically changing network conditions.

SUMMARY

The present disclosure relates to improved methods, systems, devices, and apparatuses that support techniques for controlling hybrid automatic repeat request (HARQ). For example, the present disclosure provides techniques for a user equipment (UE) to support an "aggressive" HARQ skipping mode (e.g., in addition to a "baseline" HARQ skipping mode) for furthering power savings at the UE. The UE may adaptively switch between different HARQ skipping modes, evaluation modes, or a combination thereof, to adapt to dynamically changing network conditions. For example, if the UE determines that one or more conditions for HARQ skipping are met, the UE may enter an initial evaluation mode. Based on signaling detected while in the initial evaluation mode, the UE may determine whether to enter the aggressive HARQ skipping mode (e.g., for increased power savings) or an aggressive HARQ skipping prohibited mode (e.g., for additional HARQ monitoring). The UE may periodically enter a re-evaluation mode to determine whether to switch modes—for example, out of or into the aggressive HARQ skipping mode.

When in the aggressive HARQ skipping mode (e.g., a first HARQ skipping mode), the UE may transmit an uplink message corresponding to a first HARQ identifier and may monitor a HARQ monitoring occasion associated with the first HARQ identifier for a feedback message in response. If the UE receives a HARQ positive acknowledgment (ACK) message in response while operating in the aggressive HARQ skipping mode, the UE may refrain from monitoring a subsequent HARQ monitoring occasion associated with the first HARQ identifier. For example, the UE may save processing power by operating in a low power mode rather than monitoring the subsequent HARQ monitoring occasion. After operating in the aggressive HARQ skipping mode for a threshold period of time, the UE may enter a periodic evaluation mode. In the periodic evaluation mode, the UE may operate according to a baseline HARQ skipping procedure. The UE may transmit a second uplink message corresponding to a second HARQ identifier and may receive a HARQ ACK message in a HARQ monitoring occasion associated with the second HARQ identifier. However, while in the periodic evaluation mode, the UE may monitor a subsequent HARQ monitoring occasion associated with the second HARQ identifier for an uplink retransmission grant or a new uplink grant (e.g., in case the HARQ ACK message received in the periodic evaluation mode was sent due to a heavy volume of traffic at a base station).

A method for wireless communications at a UE is described. The method may include transmitting a first uplink message corresponding to a first HARQ identifier, receiving, in a first HARQ monitoring occasion associated with the first HARQ identifier, a first positive acknowledgment HARQ message, refraining, when in a first HARQ skipping mode, from monitoring a first subsequent HARQ monitoring occasion associated with the first HARQ identifier based on receiving the first positive acknowledgment HARQ message, entering a periodic evaluation mode after a time threshold of operating in the first HARQ skipping mode, transmitting a second uplink message corresponding to a second HARQ identifier, receiving, in a second HARQ monitoring occasion associated with the second HARQ identifier, a second positive acknowledgment HARQ message, and monitoring, when in the periodic evaluation mode, a second subsequent HARQ monitoring occasion associated with the second HARQ identifier based on receiving the second positive acknowledgment HARQ message.

An apparatus for wireless communications at a UE is described. The apparatus may include a processor, memory coupled with the processor, and instructions stored in the memory. The instructions may be executable by the processor to cause the apparatus to transmit a first uplink message corresponding to a first HARQ identifier, receive, in a first HARQ monitoring occasion associated with the first HARQ identifier, a first positive acknowledgment HARQ message, refrain, when in a first HARQ skipping mode, from monitoring a first subsequent HARQ monitoring occasion associated with the first HARQ identifier based on receiving the first positive acknowledgment HARQ message, enter a periodic evaluation mode after a time threshold of operating in the first HARQ skipping mode, transmit a second uplink message corresponding to a second HARQ identifier, receive, in a second HARQ monitoring occasion associated with the second HARQ identifier, a second positive acknowledgment HARQ message, and monitor, when in the periodic evaluation mode, a second subsequent HARQ monitoring occasion associated with the second HARQ identifier based on receiving the second positive acknowledgment HARQ message.

Another apparatus for wireless communications at a UE is described. The apparatus may include means for transmitting a first uplink message corresponding to a first HARQ identifier, receiving, in a first HARQ monitoring occasion associated with the first HARQ identifier, a first positive acknowledgment HARQ message, refraining, when in a first HARQ skipping mode, from monitoring a first subsequent HARQ monitoring occasion associated with the first HARQ identifier based on receiving the first positive acknowledgment HARQ message, entering a periodic evaluation mode after a time threshold of operating in the first HARQ skipping mode, transmitting a second uplink message corresponding to a second HARQ identifier, receiving, in a second HARQ monitoring occasion associated with the second HARQ identifier, a second positive acknowledgment HARQ message, and monitoring, when in the periodic evaluation mode, a second subsequent HARQ monitoring occasion associated with the second HARQ identifier based on receiving the second positive acknowledgment HARQ message.

A non-transitory computer-readable medium storing code for wireless communications at a UE is described. The code may include instructions executable by a processor to transmit a first uplink message corresponding to a first HARQ identifier, receive, in a first HARQ monitoring occasion associated with the first HARQ identifier, a first positive acknowledgment HARQ message, refrain, when in a first HARQ skipping mode, from monitoring a first subsequent HARQ monitoring occasion associated with the first HARQ identifier based on receiving the first positive acknowledgment HARQ message, enter a periodic evaluation mode after a time threshold of operating in the first HARQ skipping mode, transmit a second uplink message corresponding to a second HARQ identifier, receive, in a second HARQ monitoring occasion associated with the second HARQ identifier, a second positive acknowledgment HARQ message, and monitor, when in the periodic evaluation mode, a second subsequent HARQ monitoring occasion associated with the second HARQ identifier based on receiving the second positive acknowledgment HARQ message.

Some examples of the method, apparatuses, and non-transitory computer-readable medium described herein may further include operations, features, means, or instructions for initiating a periodic evaluation counter based on entering the periodic evaluation mode, operating in the periodic evaluation mode while the periodic evaluation counter is running, and reentering the first HARQ skipping mode based on a threshold value of the periodic evaluation counter.

Some examples of the method, apparatuses, and non-transitory computer-readable medium described herein may further include operations, features, means, or instructions for entering the first HARQ skipping mode, initiating a first HARQ skipping counter based on entering the first HARQ skipping mode, and operating in the first HARQ skipping mode while the first HARQ skipping counter is running, where the time threshold of operating in the first HARQ skipping mode may be based on a threshold value of the first HARQ skipping counter.

Some examples of the method, apparatuses, and non-transitory computer-readable medium described herein may further include operations, features, means, or instructions for receiving a new uplink grant or a retransmission uplink grant in the second subsequent HARQ monitoring occasion associated with the second HARQ identifier and entering a first HARQ skipping prohibited mode based on receiving the second positive acknowledgment HARQ message and receiving the new uplink grant or the retransmission uplink grant.

Some examples of the method, apparatuses, and non-transitory computer-readable medium described herein may further include operations, features, means, or instructions for transmitting a third uplink message corresponding to a third HARQ identifier, receiving, in a third HARQ monitoring occasion associated with the third HARQ identifier, a third positive acknowledgment HARQ message, and monitoring, when in the first HARQ skipping prohibited mode, a third subsequent HARQ monitoring occasion associated with the third HARQ identifier based on receiving the third positive acknowledgment HARQ message.

Some examples of the method, apparatuses, and non-transitory computer-readable medium described herein may further include operations, features, means, or instructions for initiating a first HARQ skipping prohibited counter based on entering the first HARQ skipping prohibited mode, operating in the first HARQ skipping prohibited mode while the first HARQ skipping prohibited counter is running, and entering an initial evaluation mode based on a threshold value of the first HARQ skipping prohibited counter.

Some examples of the method, apparatuses, and non-transitory computer-readable medium described herein may further include operations, features, means, or instructions for receiving an adaptive retransmission uplink grant corresponding to a third HARQ identifier, identifying that an initial new uplink grant corresponding to the third HARQ identifier was not received, and entering a first HARQ skipping prohibited mode based on the identifying.

Some examples of the method, apparatuses, and non-transitory computer-readable medium described herein may further include operations, features, means, or instructions for entering an initial evaluation mode based on one or more conditions for HARQ skipping.

Some examples of the method, apparatuses, and non-transitory computer-readable medium described herein may further include operations, features, means, or instructions for transmitting a third uplink message corresponding to a third HARQ identifier, receiving, in a third HARQ monitoring occasion associated with the third HARQ identifier, a third positive acknowledgment HARQ message, and monitoring, when in the initial evaluation mode, a third subsequent HARQ monitoring occasion associated with the third HARQ identifier based on receiving the third positive acknowledgment HARQ message.

Some examples of the method, apparatuses, and non-transitory computer-readable medium described herein may further include operations, features, means, or instructions for receiving a new uplink grant or a retransmission uplink grant in the third subsequent HARQ monitoring occasion associated with the third HARQ identifier and entering a first HARQ skipping prohibited mode based on receiving the third positive acknowledgment HARQ message and receiving the new uplink grant or the retransmission uplink grant.

Some examples of the method, apparatuses, and non-transitory computer-readable medium described herein may further include operations, features, means, or instructions for initiating at least one of an initial evaluation counter or an initial evaluation timer based on entering the initial evaluation mode, operating in the initial evaluation mode while the initial evaluation counter and/or the initial evaluation timer is running, and entering the first HARQ skipping mode based on a threshold value of the initial evaluation counter and/or the initial evaluation timer.

Some examples of the method, apparatuses, and non-transitory computer-readable medium described herein may further include operations, features, means, or instructions for identifying the presence of a background data call while the initial evaluation counter and/or the initial evaluation timer is running, pausing the initial evaluation counter and/or initial evaluation timer for at least a portion of the background data call, and resuming the initial evaluation counter and/or an initial evaluation timer based at least in part on a termination of the background data call.

In some examples of the method, apparatuses, and non-transitory computer-readable medium described herein, the one or more conditions for HARQ skipping include inactive carrier aggregation, a long connected mode discontinuous reception (CDRX) period, an inactivity timer shorter than an inactivity timer threshold, an on duration shorter than an on duration threshold, voice over long term evolution (VoLTE) call operation, absence of a background data call, a channel state feedback message associated with an uplink retransmission active time occasion, a sounding reference signal associated with an uplink retransmission active time occasion, transmission time interval bundling not being configured, or a combination thereof.

Some examples of the method, apparatuses, and non-transitory computer-readable medium described herein may further include operations, features, means, or instructions for applying HARQ skipping based at least in part on determining that the channel state feedback message and/or the sounding reference signal is scheduled to be transmitted within the uplink retransmission active time occasion, skipping monitoring one or more uplink retransmission active time occasions before the scheduled transmission of the channel state feedback message and/or the sounding reference signal, and transmitting the channel state feedback message and/or the sounding reference signal with an uplink retransmission during the uplink retransmission active time occasion based at least in part on the HARQ skipping Some examples of the method, apparatuses, and non-transitory computer-readable medium described herein may further include operations, features, means, or instructions for performing a handover procedure from a first base station to a second base station and entering an initial evaluation mode based on performing the handover procedure.

Some examples of the method, apparatuses, and non-transitory computer-readable medium described herein may further include operations, features, means, or instructions for initiating a VoLTE call and entering an initial evaluation mode based on initiating the VoLTE call.

Some examples of the method, apparatuses, and non-transitory computer-readable medium described herein may further include operations, features, means, or instructions for entering the periodic evaluation mode one or more times during a duration of the VoLTE call.

Some examples of the method, apparatuses, and non-transitory computer-readable medium described herein may further include operations, features, means, or instructions for initiating a VoLTE call, determining that one or more conditions for HARQ skipping are not met based on initiating the VoLTE call, and entering an initial evaluation mode based on the one or more conditions for HARQ skipping being met during a duration of the VoLTE call.

Some examples of the method, apparatuses, and non-transitory computer-readable medium described herein may further include operations, features, means, or instructions for identifying one or more transmissions during an initial evaluation mode, wherein the one or more transmissions are not associated with VoLTE traffic calls, and pausing the initial evaluation mode based on the identifying.

Some examples of the method, apparatuses, and non-transitory computer-readable medium described herein may further include operations, features, means, or instructions for flushing a HARQ buffer for the first HARQ identifier based on operating in the first HARQ skipping mode and receiving the first positive acknowledgment HARQ message.

Some examples of the method, apparatuses, and non-transitory computer-readable medium described herein may further include operations, features, means, or instructions for stopping an uplink retransmission timer based on operating in the first HARQ skipping mode and receiving the first positive acknowledgment HARQ message.

Some examples of the method, apparatuses, and non-transitory computer-readable medium described herein may further include operations, features, means, or instructions for entering a low power mode based on operating in the first HARQ skipping mode and receiving the first positive acknowledgment HARQ message, where refraining from monitoring the first subsequent HARQ monitoring occasion associated with the first HARQ identifier may be based on operating in the low power mode.

In some examples of the method, apparatuses, and non-transitory computer-readable medium described herein, monitoring the second subsequent HARQ monitoring occasion associated with the second HARQ identifier may include operations, features, means, or instructions for operating in a second HARQ skipping mode different from the first HARQ skipping mode while operating in the periodic evaluation mode.

In some examples of the method, apparatuses, and non-transitory computer-readable medium described herein, the first positive acknowledgment HARQ message and the second positive acknowledgment HARQ message include physical channel HARQ indicator channel (PHICH) positive acknowledgment messages.

In some examples of the method, apparatuses, and non-transitory computer-readable medium described herein, the first subsequent HARQ monitoring occasion associated with the first HARQ identifier may be eight subframes after the first HARQ monitoring occasion associated with the first HARQ identifier.

DETAILED DESCRIPTION

Figure 1:
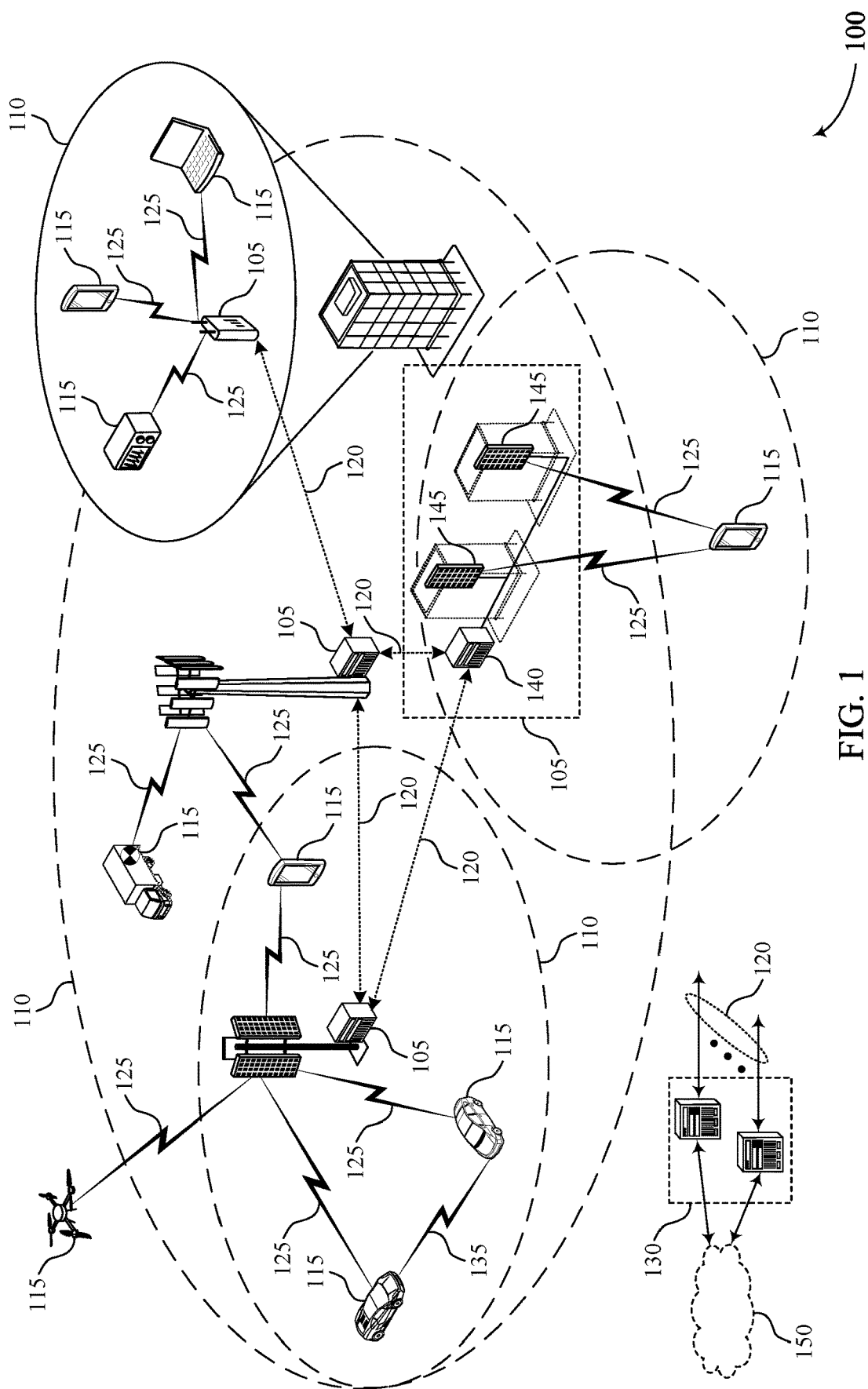
FIGS. 1 and 2 illustrate examples of wireless communications systems that support techniques for controlling hybrid automatic repeat request (HARQ) in accordance with various aspects of the present disclosure.

In some wireless communications systems, a user equipment (UE) may be configured to operate in a discontinuous reception (DRX) mode, in which the UE may enter a low power state (e.g., an inactive or idle state) during occasions when the UE does not have data to transmit or receive. Operating in accordance with the low power mode may increase power savings at the UE. In some cases, the UE may support connected mode DRX (CDRX), in which the UE may remain connected to a base station while operating in the low power state. According to some DRX configurations (e.g., CDRX), the UE may be configured with a number of ON and OFF durations (e.g., according to a number of timers), where the UE may receive or transmit information during indicated ON durations and may enter a sleep state during indicated OFF durations. In some examples, the UE may wake up to transmit an uplink message (e.g., via a physical uplink shared channel (PUSCH)) to a base station, and the UE may monitor for possible uplink retransmission grants or a hybrid automatic repeat request (HARQ) positive acknowledgment (ACK) message from the base station, for example, during a HARQ monitoring occasion.

In some cases, the UE may receive a HARQ ACK message from the base station in the HARQ monitoring occasion. For example, the base station may transmit the HARQ ACK message to the UE in order to indicate successful reception of the uplink message at the base station or to indicate a high volume of traffic at the base station. The UE may continue to monitor for retransmission grants from the base station even after receiving the HARQ ACK message (e.g., in case the HARQ ACK message is based on the high volume of traffic at the base station). The UE may continue monitoring HARQ monitoring occasions associated with the HARQ identifier for the uplink message until the UE reaches a maximum HARQ retransmission number or until a new transmission is scheduled for the same HARQ identifier. This continued monitoring may result in a significant power overhead at the UE.

To reduce the amount of time that the UE is awake to monitor for transmissions and, correspondingly, to increase power savings at the UE, the UE may implement a number of different power saving techniques. For example, the UE may operate according to a "baseline" HARQ skipping mode, in which the UE may wake up to monitor a subsequent HARQ monitoring occasion associated with a HARQ identifier after receiving a HARQ ACK message for that HARQ identifier. If the UE does not receive an uplink retransmission grant or a new uplink grant in this subsequent HARQ monitoring occasion, the UE may return to sleep and may refrain from monitoring further HARQ monitoring occasions associated with the same HARQ identifier for improved power savings. Additionally or alternatively, the UE may operate according to an "aggressive" HARQ skipping mode, in which the UE may enter a sleep mode or inactive mode after receiving a HARQ ACK message without monitoring a subsequent HARQ monitoring occasion associated with the same HARQ identifier. As such, the aggressive HARQ skipping mode may support further power savings at the UE than the baseline HARQ skipping mode.

The UE may switch between different HARQ skipping modes based on various conditions in order to increase power savings and dynamically adapt to changes in the network. For example, the UE may perform an initial evaluation (e.g., in an initial evaluation mode) to determine whether to enter into an aggressive HARQ skipping mode. When in the aggressive HARQ skipping mode, the UE may periodically enter a periodic evaluation mode to assess whether the UE should remain in the aggressive HARQ skipping mode, or whether the UE should operate according to a different mode. For example, in some cases, the UE may determine that a timer and/or a counter associated with a given mode has reached a threshold time and/or number of counts, or the UE may determine that it has received a "false" ACK message (e.g., a HARQ ACK message transmitted by a base station based on a threshold amount of traffic at the base station). If the UE identifies a false ACK message, the UE may enter an aggressive HARQ skipping prohibited mode. After a threshold amount of time in the aggressive HARQ skipping prohibited mode, the UE may return to an initial evaluation mode in order to redetermine whether conditions are met to enter the aggressive HARQ skipping mode. By periodically assessing whether the UE should remain in an aggressive HARQ skipping mode, the UE may be able to adapt to changes in the network, such as changes in base station behavior or variable traffic conditions. In some examples, the UE may change between HARQ skipping modes multiple times during a single voice over long term evolution (VoLTE) call, which may optimize power savings. Additionally or alternatively, the UE may effectively check for retransmission grants or false ACK messages sent by a base station, which may reduce latency in the network.

Aspects of the disclosure are initially described in the context of wireless communications systems. Additional aspects of the disclosure are described with respect to various evaluation processes and algorithms for determining HARQ processing modes (e.g., HARQ skipping modes). Aspects of the disclosure are further illustrated by and described with reference to apparatus diagrams, system diagrams, and flowcharts that relate to techniques for controlling HARQ.

FIG. 1 illustrates an example of a wireless communications system 100 that supports techniques for controlling HARQ in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with some bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta f_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell may cover a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE in the unlicensed radio frequency spectrum band, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may support CDRX and HARQ processing. For example, the UE 115 may monitor for HARQ feedback from a base station 105 while in an active state of a DRX cycle. In one example, the UE 115 may transmit an uplink message (e.g., via a PUSCH) to a base station 105 and may monitor for possible uplink retransmission grants, new uplink grants, or HARQ messages transmitted by the base station 105 during a HARQ monitoring period following transmission of the uplink message. In some cases, the UE 115 may receive a HARQ ACK message from the base station 105 during the HARQ monitoring period. The UE 115, however, may continue to monitor for retransmission grants or new uplink grants that may be transmitted by the base station 105 even after the UE 115 receives the HARQ ACK message. The UE 115 may continue monitoring HARQ monitoring occasions associated with a HARQ identifier until reaching a maximum HARQ retransmission number for the HARQ identifier or until a new transmission is scheduled for the HARQ identifier. Such continued monitoring processes may cost a significant amount of power at the UE 115.

To reduce the amount of time that the UE 115 remains awake to monitor for transmissions, the UE 115 may implement a number of different techniques for HARQ monitoring. In some cases, the UE 115 may implement a baseline HARQ skipping mode, in which the UE 115 may wake up (or remain awake) to monitor a subsequent HARQ monitoring occasion that is a number of subframes (e.g., 8 subframes) after reception of a HARQ ACK message from a base station 105. The UE 115 may then return to sleep after checking the subsequent HARQ monitoring occasion for a retransmission grant or a new uplink grant. In some other cases, the UE 115 may implement an aggressive HARQ skipping mode, in which the UE 115 may not monitor a subsequent HARQ monitoring occasion after reception of a HARQ ACK message, but instead may enter a sleep mode or inactive mode after receiving the HARQ ACK message.

In some cases, a UE 115 may switch between different HARQ monitoring modes in order to optimize power savings and dynamically adapt to network changes. The UE 115 may perform an initial evaluation to determine whether to enter into an aggressive HARQ skipping mode. While operating in the aggressive HARQ skipping mode, the UE 115 may periodically enter a periodic evaluation mode to determine whether to remain in the aggressive HARQ skipping mode, or whether to operate according to a different HARQ monitoring mode. For example, the UE 115 may determine that a timer associated with a given mode has reached a threshold time, or the UE 115 may determine that it has received a false ACK message. If the UE 115 receives a false ACK message, the UE 115 may enter an aggressive HARQ skipping prohibited mode. After a threshold amount of time in the aggressive HARQ skipping prohibited mode, the UE 115 may return to an initial evaluation mode in order to determine whether conditions are met to reenter the aggressive HARQ skipping mode.

Figure 2:
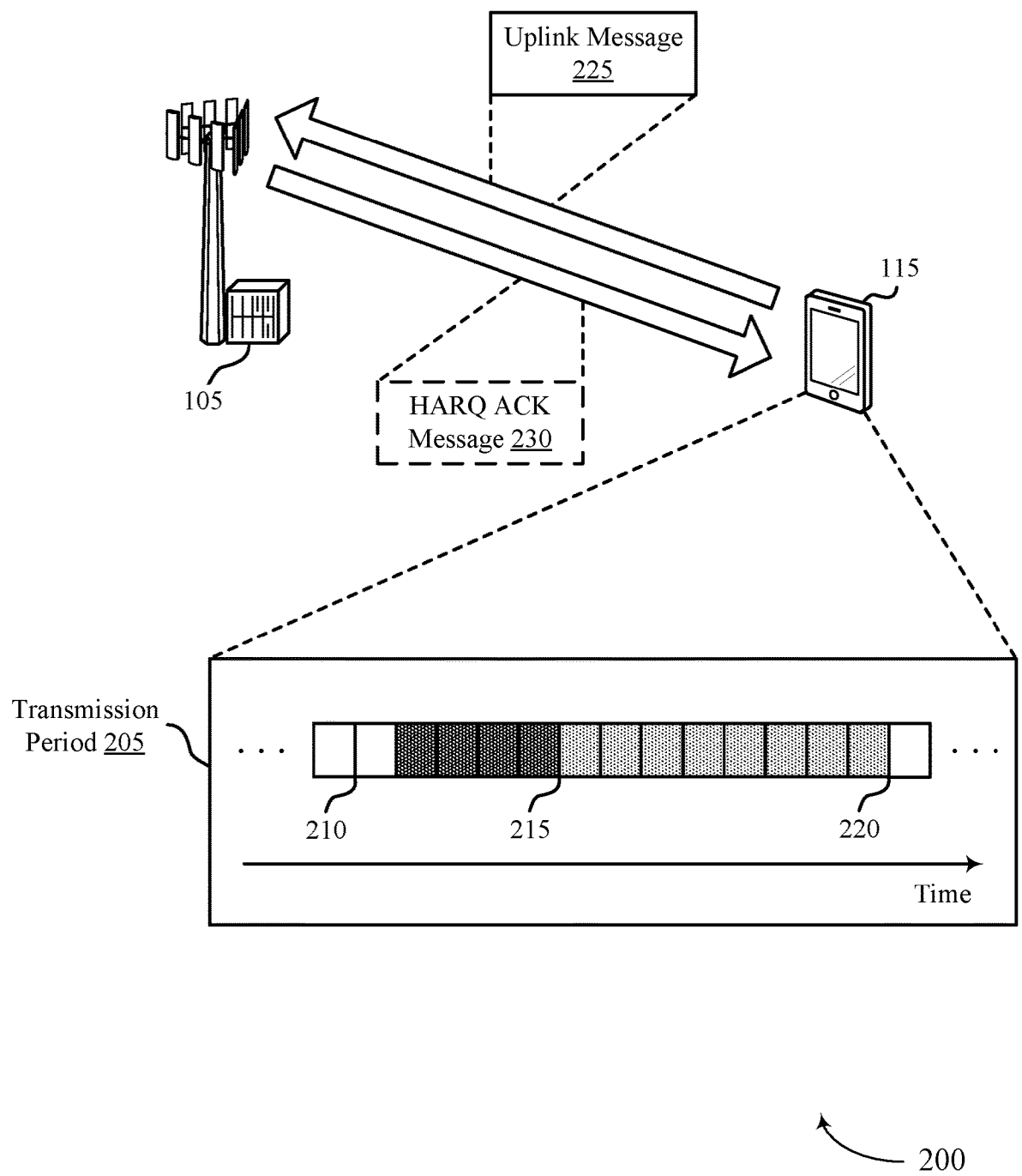

FIG. 2 illustrates an example of a wireless communications system 200 that supports techniques for controlling HARQ in accordance with various aspects of the present disclosure. In some examples, the wireless communications system 200 may implement aspects of a wireless communications system 100. The wireless communications system 200 may include a base station 105 and a UE 115, which may be examples of a base station 105 and a UE 115 as described with reference to FIG. 1.

The UE 115 may operate according to various reception modes to receive data sent by a base station 105 or another network entity. For example, the UE 115 may support discontinuous reception (DRX), in which the UE 115 may be configured to enter a low power state (e.g., an inactive state) during times when the UE 115 does not have data to transmit or receive. In some cases, the UE 115 may support connected mode DRX (CDRX), in which the UE 115 may remain connected to the base station 105 during DRX operations. Such DRX configurations may increase power savings at the UE 115.

According to some DRX configurations (e.g., CDRX), the UE 115 may operate according to a number of ON and OFF durations. The UE 115 may receive or transmit information during indicated ON durations and may enter a sleep state during indicated OFF durations. In some cases, the UE 115 may wake up to transmit data (e.g., an uplink message 225 via a PUSCH) to the base station 105 during an ON duration of a first subframe (e.g., at 210) of a transmission period 205 and may remain awake—or wake back up—to receive a HARQ ACK message 230 from the base station 105 during a subsequent subframe (e.g., at 215). For example, the UE 115 and the base station 105 may indicate reception of communications by using HARQ processes. The base station 105 may transmit a HARQ ACK message 230 over a physical channel hybrid ARQ indicator channel (PHICH) to indicate that it has successfully received an uplink message 225 sent by the UE 115.

During a HARQ processing period (e.g., a HARQ monitoring occasion), the UE 115 may monitor for a HARQ ACK message 230 from the base station 105. In cases where the UE 115 receives the HARQ ACK message 230 (e.g., at 215), however, the UE 115 may still monitor for possible communications sent by the base station 105 in a subsequent HARQ monitoring occasion at 220 (e.g., 8 subframes after receiving the HARQ ACK message 230) in order to check for additional messages transmitted by the base station 105. For example, the base station 105 may transmit uplink grants or requests for retransmission of data, etc. In such cases, the UE 115 may monitor for communications from the base station 105 in each subsequent HARQ monitoring occasion for the relevant HARQ identifier until a HARQ retransmission threshold is reached, until a different transmission is scheduled on the same HARQ identifier, or a combination thereof.

In some cases, the base station 105 may send a false ACK message, for example, when the network is busy. In some other cases, the UE 115 may incorrectly identify an ACK message (e.g., in some examples where PHICH decoding fails). In any of these cases, the base station 105 may later request a retransmission from the UE 115. In order to receive such a retransmission request, the UE 115 may wake up to receive a physical downlink control channel (PDCCH) message carrying the retransmission request. As a result, the UE 115 may remain awake (or wake back up) for a given period of time after receiving a HARQ ACK message 230 to account for such cases where the received HARQ ACK message 230 is a false ACK message. If the UE 115 receives a HARQ ACK message 230 from the base station 105 at 215, the UE 115 may monitor the channel during one or more subsequent HARQ monitoring occasions. For example, the UE 115 may monitor the next uplink HARQ monitoring occasion (e.g., at 220, 8 subframes after the HARQ ACK message 230 is received) to determine if the base station 105 transmits an uplink retransmission grant or a new uplink grant. After monitoring the next uplink HARQ monitoring occasion at 220, the UE 115 may either stay awake to complete any indicated or scheduled communications or may return to an inactive mode (e.g., upon expiration of all timers keeping the UE 115 awake).

The amount of time that the UE 115 is awake to monitor subsequent HARQ monitoring occasions associated with a HARQ identifier after receiving a HARQ ACK message 230 for the HARQ identifier may be costly to a UE's power usage. For example, monitoring for transmissions may incur a significant processing overhead at the UE 115 (e.g., as compared to the UE 115 operating in a sleep state or low power mode). The UE 115 may implement a number of different power saving methods related to HARQ monitoring to reduce this processing overhead. For example, the UE 115 may implement an aggressive algorithm for HARQ skipping, in which the UE 115 may go to sleep after receiving the HARQ ACK message 230 from the base station 105 (e.g., for all subsequent HARQ monitoring occasions associated with the HARQ identifier of the HARQ ACK message 230). As a result, the UE 115 may operate as if the HARQ ACK message 230 is received correctly and in response to the uplink message 225 (e.g., as if the HARQ ACK message 230 is not a false ACK). By implementing the aggressive HARQ skipping mode, the UE 115 may increase its time spent in an inactive or low power mode, which may benefit power savings at the UE 115.

In some cases, the UE 115 may switch between operating according to a baseline HARQ skipping mode, an aggressive HARQ skipping mode, a HARQ non-skipping mode, or any combination of these and other HARQ skipping modes. In such cases, the UE 115 may check a number of conditions to determine in which mode to operate. These conditions may be referred to as baseline conditions for the UE 115 to operate in the baseline HARQ skipping mode. For example, the UE 115 may check that the network is not configured for active uplink or downlink carrier aggregation (CA). Additionally or alternatively, the UE 115 may determine that the network is configured for uplink or downlink CA, but uplink or downlink CA may not be active. Additionally or alternatively, the conditions may include that a DRX cycle is configured as a CDRX cycle, which may include a long CDRX period (e.g., a long period of either 40 ms or 20 ms). In some examples, the CDRX cycle may be configured to include a short CDRX period. Furthermore, various timers may be configured according to the CDRX period. For example, an inactive timer and on-duration timer may be configured for 10 ms or less.

Additionally or alternatively, the conditions may include the UE 115 operating in an active VoLTE call (e.g., with quality of service class identifier (QCI)=1 and no background data), and HARQ skipping may not be applied for cases including background data (e.g., QCI 1 flows) where the radio link control (RLC) layer may send an indication to a MAC layer (e.g., ML1). Further, some signaling—such as channel state feedback (CSF) and sounding reference signaling (SRS)—may not fall within the uplink retransmission active time occasion for the UE 115 to perform HARQ skipping. In some other examples, the UE 115 may enable HARQ skipping for occasions where the CSF and/or SRS occasions do not collide with a retransmission opportunity (e.g., HARQ skipping is disabled in cases where the CSF and/or SRS occasions collide with the retransmission opportunity, but HARQ skipping may be enabled in cases where the CSF and/or SRS occasions are different from the retransmission opportunity). Additionally or alternatively, the conditions may include TTI bundling not being configured for transmissions. If the UE 115 determines that the set of conditions is satisfied, the UE 115 may enter a HARQ skipping mode (e.g., a baseline HARQ skipping mode or an aggressive HARQ skipping mode).

In some other examples, a CSF and/or SRS occasions may coincide or collide with an uplink retransmission opportunity. For example, a CSF and/or SRS opportunity may coincide with a first retransmission opportunity, or any number of subsequent retransmission opportunities. In one example, the CSF and/or SRS opportunity may fall in a fifth retransmission opportunity (e.g., of retransmission opportunities 1 through 5). In such cases, the UE 115 may apply HARQ skipping such that the UE 115 may refrain from monitoring preceding uplink retransmission opportunities, (e.g., retransmission opportunities 1 through 4) until the UE 115 reaches the CSF and/or SRS opportunity associated with the fifth retransmission opportunity. The UE 115 may perform the uplink retransmission (if applicable, for example, if the UE 115 has an uplink retransmission to perform) and the CSF and/or SRS together, and then continue operating in accordance with a baseline or aggressive HARQ skipping mode.

According to a baseline HARQ skipping mode, if a UE 115 transmits an uplink message 225—for example, at 210—and receives a HARQ ACK message 230—for example, at 215—in response, the UE 115 may monitor for transmissions from the base station 105 (e.g., on a physical downlink control channel (PDCCH)) during a subsequent HARQ monitoring occasion at 220. The UE 115 may attempt to decode a PDCCH transmission at 220 and may perform a number of operations based on the results of the PDCCH decoding. In some examples, the UE 115 may not receive an uplink grant (e.g., a retransmission or new uplink grant) in the subsequent HARQ monitoring occasion at 220 and may perform early termination (e.g., the UE 115 may refrain from monitoring further subsequent HARQ monitoring occasions after the subsequent HARQ monitoring occasion at 220). In such examples, the UE 115 may flush the corresponding uplink HARQ buffer and may stop a corresponding uplink retransmission timer. In another example, the UE 115 may receive an uplink retransmission grant during the subsequent HARQ monitoring occasion at 220, and the UE 115 may retransmit the uplink message 225 and continue monitoring for a HARQ message associated with the current HARQ identifier (e.g., in response to the retransmitted uplink message 225). In yet another example, the UE 115 may receive a new uplink grant associated with a different HARQ identifier, and the UE 115 may transmit a new uplink message 225 and start monitoring for a HARQ message associated with the new HARQ identifier (e.g., in response to the new uplink message 225).

In some cases, the UE 115 may enter an aggressive HARQ skipping mode after an initial evaluation phase. For a given HARQ identifier, the UE 115 may transmit an initial PUSCH transmission (e.g., an uplink message 225) at 210, and the UE 115 may terminate future HARQ monitoring for the given HARQ identifier after receiving a HARQ ACK message 230 in response to the PUSCH transmission at 215 (e.g., when operating in the aggressive HARQ skipping mode). In such cases, the UE 115 may flush the corresponding HARQ buffer and may stop the corresponding uplink retransmission timer upon receiving the HARQ ACK message 230. According to the aggressive HARQ skipping mode, the UE 115 may return to an inactive or sleep mode after receiving the PHICH ACK at 215, and may not wake up again to monitor for additional transmissions during the next HARQ monitoring occasion associated with the given HARQ identifier at 220.

The UE 115 may apply an algorithm or other decision-making process in determining which HARQ monitoring mode to implement. For example, in cases where a UE 115 implements the aggressive HARQ skipping mode, the UE 115 may first determine that the HARQ ACK message 230 received is likely to be a real ACK message (e.g., based on failing to identify any false ACK messages for some defined time period). Additionally or alternatively, the UE 115 may apply recovery processes to prohibit the aggressive HARQ skipping mode in cases where performance is compromised, or until conditions support a low performance loss for the HARQ skipping mode. After operating in an aggressive HARQ skipping mode for a period of time, the UE 115 may enter a periodic evaluation phase to determine whether to remain in the aggressive HARQ skipping mode or switch to prohibit aggressive HARQ skipping for an amount of time. The UE 115 may enter different HARQ monitoring modes during a single VoLTE call, which may allow the UE 115 to adapt to changes in the network and effectively increase power savings and communications quality throughout a VoLTE call.

Figure 3:
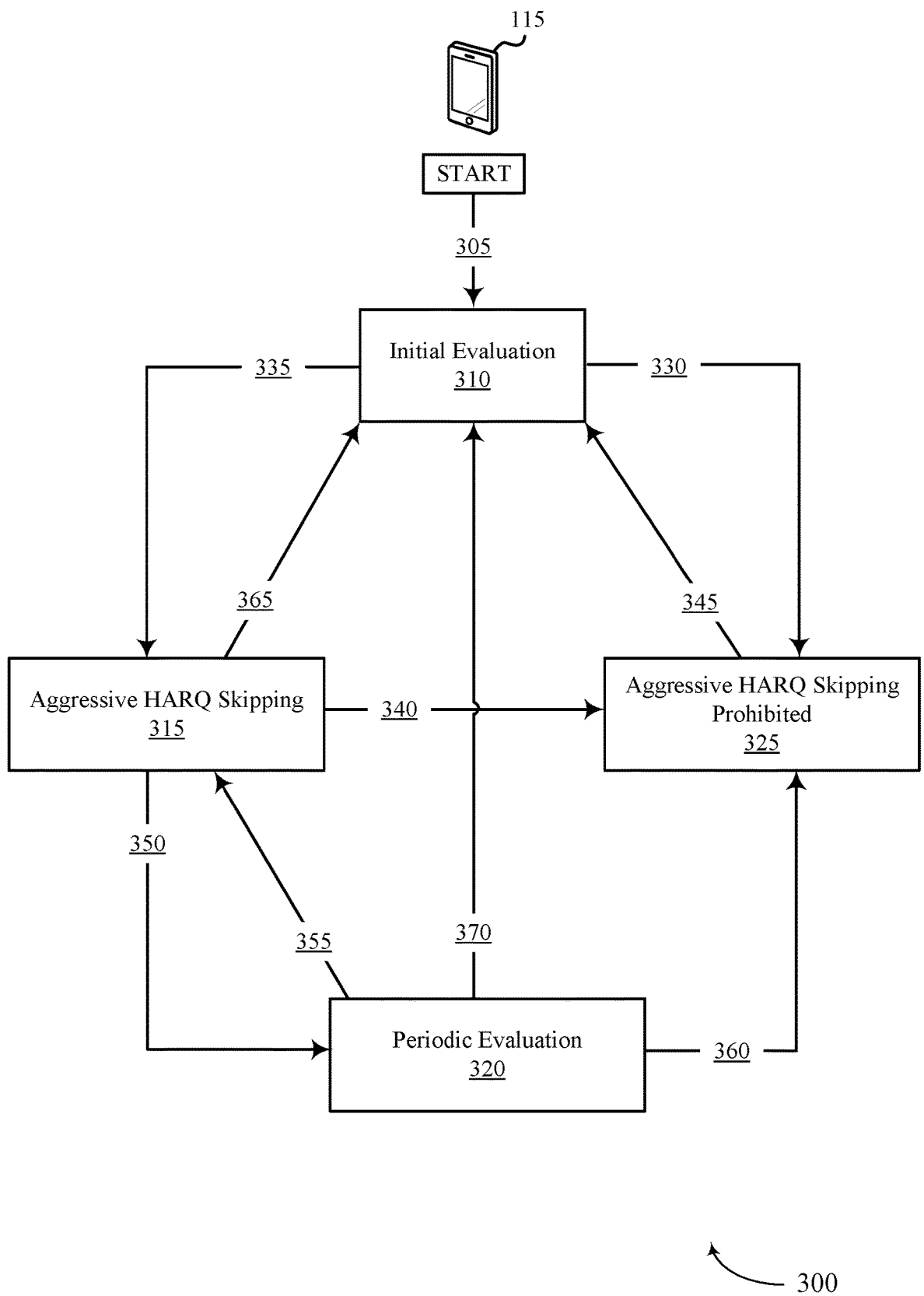
FIG. 3 illustrates an example of a HARQ monitoring evaluation flowchart that supports techniques for controlling HARQ in accordance with various aspects of the present disclosure.

FIG. 3 illustrates an example of a HARQ monitoring evaluation flowchart 300 that supports techniques for controlling HARQ in accordance with various aspects of the present disclosure. In some examples, the HARQ monitoring evaluation flowchart 300 may implement aspects of a wireless communications system 100 or 200 (as shown in FIGS. 1 and 2). For example, a UE 115 may implement the HARQ monitoring evaluation flowchart 300, which may be an example of a UE 115 as described with reference to FIGS. 1 and 2.

The UE 115 may use an algorithm or set of rules as illustrated in FIG. 3 to determine a HARQ skipping process to implement. At 305 in the HARQ monitoring evaluation flowchart 300, the UE 115 may determine that a baseline set of conditions are met for baseline HARQ skipping. Such baseline conditions may be the same as the conditions described with reference to FIG. 2. As such, the UE 115 may determine to perform baseline HARQ skipping and may enter an initial evaluation phase 310 to determine whether to switch to aggressive HARQ skipping. Upon starting the initial evaluation phase 310, the UE 115 may set an uplink grant timer and/or an uplink grant counter for the initial evaluation to 0 (e.g., init_eval_ul_grant_count=0), and the UE 115 may determine that the UE 115 has not received a false ACK message from a base station (e.g., ack_is_not_ack="false"). The UE 115 may operate according to baseline HARQ skipping while in the initial evaluation phase 310.

In the initial evaluation phase 310, the UE 115 may monitor one or more occasions associated with a configured CDRX cycle to determine whether a received HARQ ACK message is a real ACK. To determine whether a detected ACK message is false, the UE 115 may monitor for a grant that is transmitted in a subsequent subframe associated with a subsequent HARQ monitoring occasion (e.g., the next HARQ monitoring occasion for the same HARQ identifier in the 8th subframe after receiving the ACK message). In cases where the UE 115 detects a transmission such as a retransmission request or a new uplink grant from the base station in the subsequent HARQ monitoring occasion after receiving an ACK message, the UE 115 may determine that the received ACK message is a false ACK. If the UE 115 determines that it receives a false ACK during the initial evaluation phase 310 (e.g., ack_is_not_ack_detected="true"), then the UE 115 may enter an aggressive HARQ skipping prohibited mode 325 at 330 for a given period of time configured by a counter (e.g., an agg_harqskip_prohibit _counter). The UE 115 may set the agg_harqskip_prohibit_counter to a threshold value (e.g., agg_prohibit_cycleCnt) if counting down or to 0 if counting up at 330. If the UE 115 does not receive a new or retransmission uplink grant in the subsequent HARQ monitoring occasion while operating in the initial evaluation phase 310, the UE 115 may increment a counter (e.g., the init_eval_ul_grant_count) and continue operating in the initial evaluation phase 310. In some examples, the UE 115 may concurrently run the uplink grant timer and the uplink grant counter (e.g., the UE 115 may run the uplink grant timer and the uplink grant counter at the same time) and may monitor for uplink grants until the expiration of the timer and/or counter (e.g., using an OR logical operation).

During the initial evaluation phase 310, the UE 115 may monitor for uplink grants for a period of time (e.g., using a counter), for a threshold number of uplink grants (e.g., eval_n1), or a combination thereof. A counter may be incremented (e.g., init_eval_ulgrant_count++) for each received uplink grant, and a threshold number of counts may be set for the counter (e.g., eval_n1 if counting up). If the counter reaches the threshold value (init_eval_ulgrant_count==eval_n1) during the initial evaluation phase 310 without the UE 115 detecting a false ACK (ack_is_not_ack_detected==false), the UE 115 may determine to enter the aggressive HARQ skipping mode 315 at 335.

While operating in the aggressive HARQ skipping mode 315, the UE 115 may not monitor subsequent HARQ monitoring occasions for a HARQ identifier after receiving an ACK for the HARQ identifier. This may allow the UE 115 to obtain greater power savings than the baseline HARQ skipping mode. The UE 115 may operate in the aggressive HARQ skipping mode 315 for some period of time configured by an additional counter (e.g., an aggressive HARQ skipping counter, such as agg_harqskip_counter). The counter may be set according to a number of cycles (e.g., CDRX cycles), a time span, a number of uplink transmissions, etc. For example, at 335, the UE 115 may set agg_harqskip_counter=agg_cycleCnt if counting down or 0 if counting up and may decrement or increment the counter based on operating in the aggressive HARQ skipping mode 315. For example, the amount of time spent in the aggressive HARQ skipping mode 315 may be based on the CDRX cycle (e.g., agg_cycleCnt may be 20 cycles for 40 ms CDRX, 40 cycles for 20 ms CDRX, or some other number of cycles or time span). The UE 115 may remain in the aggressive HARQ skipping mode 315 while the agg_harqskip_counter is running (e.g., has not reached 0 if counting down or has not reached agg_cycleCnt if counting up).

The UE 115 may employ a number of different techniques to determine whether a detected ACK is a false ACK. In an example, the UE 115 may receive an adaptive uplink retransmission grant for a HARQ identifier without receiving the initial uplink grant for the HARQ identifier. The UE 115 may determine that this initial uplink grant for the HARQ identifier was missed based on the UE 115 operating in the aggressive HARQ skipping mode 315 and switching to a low power state after receiving a false ACK. In another example, the UE 115 may receive an initial PHICH ACK for a first PUSCH message transmitted by the UE 115 and may receive either a new uplink grant or a retransmission uplink grant at the next HARQ monitoring occasion (e.g., when operating in the baseline HARQ skipping mode and monitoring the next HARQ monitoring occasion). In such cases, the UE 115 may determine that the initial PHICH ACK was a false ACK.

In some cases, if the UE 115 determines that a received ACK is a false ACK (e.g., if ack_is_not_ack_detected="true") while in the aggressive HARQ skipping mode 315, the UE 115 may enter the aggressive HARQ skipping prohibited mode 325 at 340. When aggressive HARQ skipping is prohibited, the UE 115 may not be able to perform aggressive HARQ skipping for some period of time configured according to different CDRX modes, and instead the UE 115 may operate in the baseline HARQ skipping mode. The UE 115 may operate in the aggressive HARQ skipping prohibited mode 325 for a number of counts or cycles (e.g., according to an agg_harqskipprohibit_counter), where the number of cycles or counts may be configured according to different CDRX modes (e.g., 1500 counts for 40 ms CDRX, 3000 counts for 20 ms CDRX, etc.). At the end of the prohibition time (e.g., when the counter has completed the specified number of counts during the aggressive HARQ skipping prohibited mode 325, such as agg_prohibit_cycleCnt counts) the UE 115 may return to the initial evaluation phase 310 at 345. For example, if decreasing the agg_harqskipprohibit_counter from agg_prohibit_cycleCnt to 0, the UE 115 may reenter the initial evaluation phase 310 when agg_harqskip_prohibit_counter==0 and may set the init_eval_ulgrant_count to 0.

In some other cases, the UE 115 may not detect a false ACK while operating in the aggressive HARQ skipping mode 315 (e.g., because there are no false ACKs, because the UE 115 does not monitor the subsequent HARQ monitoring occasion to determine if a received ACK message is a false ACK, etc.). The UE 115 may run a timer or counter while operating in the aggressive HARQ skipping mode 315. If the UE 115 does not detect a false ACK during the entire timer duration (e.g., before agg_harqskip_count==0 when counting down), the UE 115 may enter a periodic evaluation mode 320 at 350 when the agg_harqskip_count reaches a threshold value (e.g., 0 if counting down, agg_cycleCnt if counting up). The UE 115 may set a periodic evaluation counter when entering the periodic evaluation mode 320 (e.g., p_eval_ul_grant_count=0). While operating in the periodic evaluation mode 320, the UE 115 may operate according to the baseline HARQ skipping mode. For example, the UE 115 may wake up to monitor a subsequent HARQ monitoring occasion (e.g., at the 8th subframe) after receiving an ACK message for an uplink message. In the periodic evaluation mode 340, the UE 115 may determine that a received ACK message is a false ACK if the UE 115 receives a new or retransmission uplink grant in the monitored subsequent HARQ monitoring occasion. Implementing the periodic evaluation mode 320 may increase the robustness of the HARQ skipping optimization at the UE 115, as the UE 115 may efficiently detect changes in a base station's behavior pattern while operating in the periodic evaluation mode 320.

The UE 115 may be configured to stay in the periodic evaluation mode 320 according to a counter associated with a period of time or a number of grants (e.g., eval_n2=2 uplink grants). If no false ACKs are detected (ack_is_not_ack_detected==false) and the counter reaches a threshold value (p_eval_ulgrant_count==eval_n2), the UE 115 may return to the aggressive HARQ skipping mode 315 at 355. Alternatively, if while operating in the periodic evaluation mode 320 the UE 115 determines that an ACK received from a base station is a false ACK (e.g., ack_is_not_ack_detected="true"), the UE 115 may enter the aggressive HARQ skipping prohibited mode 325 at 360. The UE 115 may remain in the aggressive HARQ skipping prohibited mode 325 for a given period of time configured by a timer and/or for a number of counts configured by a counter (e.g., agg_harqskip_prohibit_counter).

In some other examples, the UE 115 may operate in the aggressive HARQ skipping mode 315, the periodic evaluation mode 320, or the aggressive HARQ skipping prohibited mode 325, and may return back to the initial evaluation phase 310 based on a reinitialization trigger (e.g., at 365, 370, or 345, respectively). In some cases, the UE 115 may return to the initial evaluation phase 310 when a new VoLTE call is initiated. In some other cases, the UE 115 may return to the initial evaluation phase 310 based on a handover of the UE 115 from one base station to another, from one base station to the same base station, or based on any other reinitialization trigger. When the UE 115 reenters the initial evaluation phase 310, the UE 115 may reset the initial evaluation timer and/or initial evaluation counter (e.g., init_eval_ulgrant_count=0) and operate according to the baseline HARQ skipping mode.

In some examples, UE 115 may identify non-VoLTE traffic such as control signaling, measurement signaling, or a background data call during the initial evaluation period (e.g., init_eval_ulgrant_count). In such examples, the UE 115 may "pause" or temporarily suspend the initial evaluation period (e.g., the UE 115 may pause the initial evaluation counter and/or timer). When the UE 115 determines an end to the non-VoLTE traffic and determines that conditions for entering a HARQ skipping mode are satisfied, the UE 115 may resume the initial evaluation period (e.g., resuming the initial evaluation counter and/or timer). For example, the UE 115 in such cases may not restart the counter and/or timer altogether but may continue the counter and/or timer from where it was paused due to the non-VoLTE traffic.

In some examples, UE 115 may pause the counter and/or timer based on a violation of the one or more conditions for entering a HARQ skipping mode (e.g., inactive carrier aggregation, a long CDRX period, an inactivity timer shorter than an inactivity timer threshold, an on duration shorter than an on duration threshold, VoLTE call operation, absence of a background data call, a channel state feedback message associated with an uplink retransmission active time occasion, a sounding reference signal associated with an uplink retransmission active time occasion, transmission time interval bundling not being configured, or a combination thereof). If the UE 115 determines that the one or more violated conditions are satisfied, the UE 115 may resume the counter and/or timer.

It is to be understood that the timers and counters and threshold values described herein may be set to any values and may be configured for different values for various stages of the HARQ monitoring evaluation. For example, each counter may count up to a threshold value or count down to 0. Additionally, each counter may correspond to an amount of time, a number of cycles (e.g., CDRX cycles), a number of uplink grants, or any combination of these or other counter units. The UE 115 may be pre-configured with the counters, threshold values, or both, or may dynamically determine the counters, threshold values, or both (e.g., based on one or more parameters, such as historical data tracking the change in a base station's behavior). In some examples, the value of the timers and counters may be a static value or may be adaptively selected using an algorithm or decision process, or the values may be dynamically adjusted in accordance with various system conditions.

According to the algorithm described herein, the UE 115 may have adaptive flexibility to move between different HARQ skipping modes after the initiation of a VoLTE call. In some cases, the UE 115 may support a first HARQ skipping mode (e.g., aggressive HARQ skipping) and a second HARQ skipping mode (e.g., baseline HARQ skipping). For example, the UE 115 may begin in a baseline HARQ skipping mode (e.g., in the initial evaluation phase 310), move to an aggressive HARQ skipping mode 315, and then further move back to the baseline HARQ skipping mode (e.g., in the aggressive HARQ skipping prohibited mode 325 or the periodic evaluation mode 320) during a same VoLTE call. By changing between the baseline and aggressive HARQ skipping modes based on detecting false ACKs, the UE 115 may adapt to changes in base station behavior (e.g., as opposed to switching modes based on block error rate (BLER) statistics over a window length), improving the performance of the UE 115. Additionally, switching modes by calculating BLER based on PHICH negative acknowledgments (NACKs) may be unreliable if a base station schedules an adaptive retransmission while sending a PHICH ACK. In contrast, switching modes based on false ACK detection may be robust to such base station operations. The UE 115 may be able to change modes multiple times within a single VoLTE call based on monitoring events, such as the UE 115 detecting a false ACK message from a base station. In addition, the UE 115 may verify whether HARQ skipping processes may be applied during a VoLTE call by checking initial conditions during the initial evaluation phase 310. Such initial checks may occur multiple times during a VoLTE call, such that the UE 115 may refrain from any HARQ skipping (e.g., baseline or aggressive) if the conditions during the VoLTE call change such that the baseline conditions are no longer met.

The algorithm described with reference to the HARQ monitoring evaluation flowchart 300 may allow the UE 115 to adapt to changing network conditions. For example, in some cases the network may experience high traffic, and a base station may send a false ACK to the UE 115 during heavy traffic (e.g., to stall the UE 115 while the base station 105 handles other traffic), and then the base station may request a retransmission at some later time (e.g., when traffic subsides, when the UE's traffic is given a higher priority, etc.). In such cases, the UE 115 may operate in an aggressive HARQ skipping mode 315 during a VoLTE call, detect the false ACK (e.g., based on periodically entering the periodic evaluation mode 320), and switch to the aggressive HARQ skipping prohibited mode 325. Then, if the traffic at the base station is reduced and the base station refrains from using false ACKs, the UE 115 may switch back to the aggressive HARQ skipping mode 315 (e.g., via another initial evaluation phase 310) during the same VoLTE call. Thus, the UE 115 may be able to adapt to various network changes such as variable traffic patterns or changes in the behavior of the base station. This may allow the UE 115 to utilize aggressive HARQ skipping more frequently in order to conserve power, while reacting to changes in base station behavior so that the UE 115 does not fail to detect false ACKs due to remaining in the aggressive HARQ skipping mode 315, which could lead to issues with latency.

An initial one-time detection of a base station's scheduling pattern (e.g., at the beginning of a VoLTE call) may result in inefficient power optimization or missed uplink grants. For example, if a UE implements one-time detection at the start of a VoLTE call and detects a base station scheduling an uplink grant in an uplink HARQ monitoring occasion (e.g., 8 subframes after receiving a PHICH ACK in a CDRX cycle) for a pre-determined number of times, the UE may be barred from HARQ optimization (e.g., either baseline or aggressive HARQ skipping) for the entire duration of the VoLTE call. If the base station changes behavior (e.g., to lighter traffic) and stops scheduling new grants in uplink HARQ monitoring occasions, this UE may not enter an optimization mode for the current VoLTE call. In contrast, the UE 115 operating according to the HARQ monitoring evaluation flowchart 300 (or a similar algorithm) may enter an optimization mode (e.g., baseline HARQ skipping, aggressive HARQ skipping, or both) during the current VoLTE call, resulting in improved power savings and flexibility. Furthermore, if the UE implementing one-time detection and the UE 115 operating according to the HARQ monitoring evaluation flowchart 300 operate in aggressive HARQ skipping modes when a base station triggers an adaptive retransmission while sending a PHICH ACK, the UE 115 operating according to the HARQ monitoring evaluation flowchart 300 may detect the triggered adaptive retransmission faster than the other UE, resulting in less BLER for the UE 115 operating according to the techniques described herein.

Figure 4:
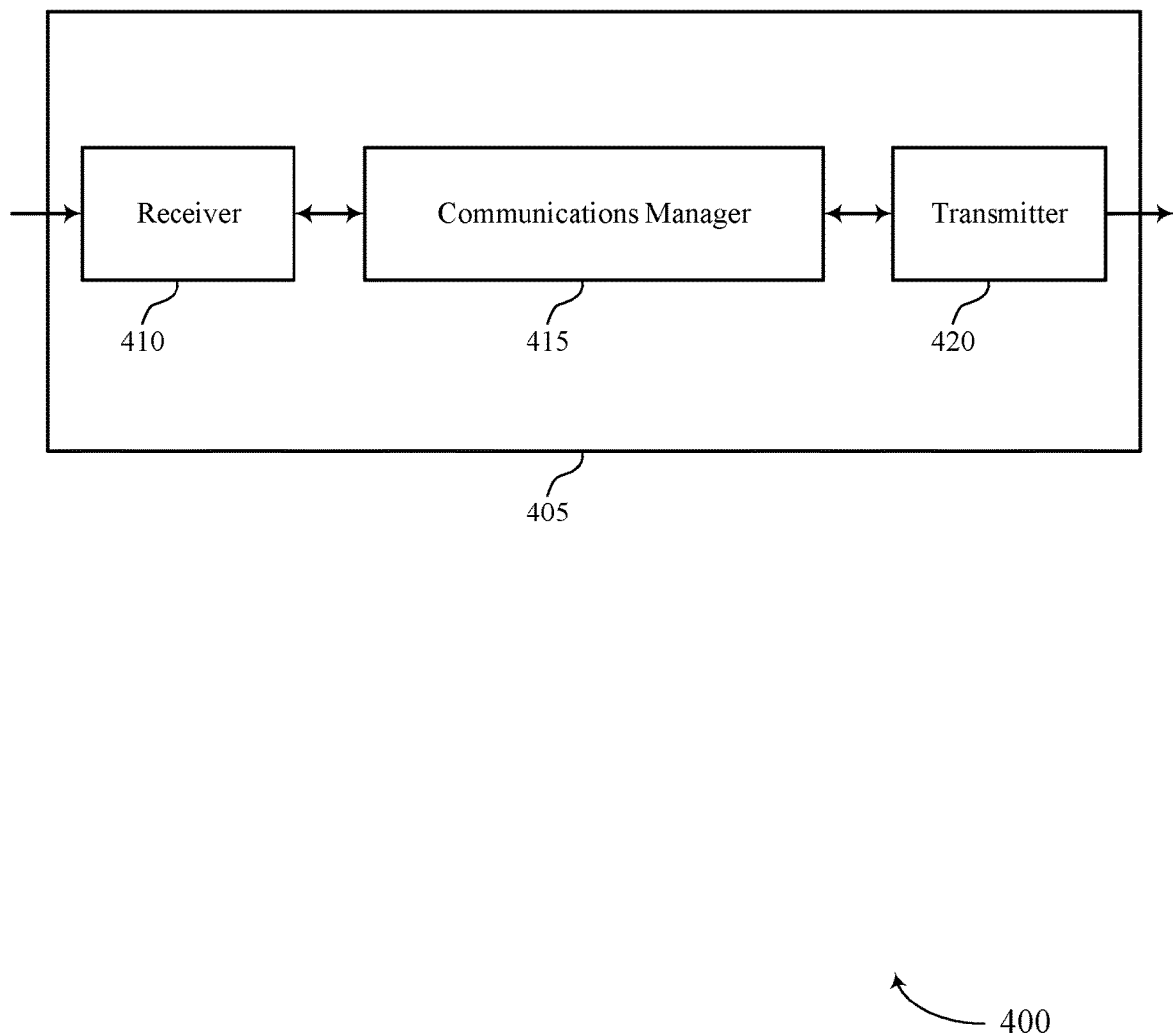
FIGS. 4 and 5 show block diagrams of devices that support techniques for controlling HARQ in accordance with various aspects of the present disclosure.

FIG. 4 shows a block diagram 400 of a device 405 that supports techniques for controlling HARQ in accordance with various aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques for controlling HARQ, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may transmit an uplink message (e.g., a first uplink message) corresponding to a first HARQ identifier; receive, in a HARQ monitoring occasion (e.g., a first HARQ monitoring occasion) associated with the first HARQ identifier, a positive acknowledgment HARQ message (e.g., a first positive acknowledgment HARQ message); and refrain, when in a first HARQ skipping mode (e.g., an aggressive HARQ skipping mode), from monitoring a subsequent HARQ monitoring occasion (e.g., a first subsequent HARQ monitoring occasion) associated with the first HARQ identifier based on receiving the first positive acknowledgment HARQ message. The communications manager 415 may enter a periodic evaluation mode after a time threshold of operating in the first HARQ skipping mode. The communications manager 415 may transmit an uplink message (e.g., a second uplink message) corresponding to a second HARQ identifier (e.g., any HARQ identifier different than, or the same as, the first HARQ identifier); receive, in a HARQ monitoring occasion (e.g., a second HARQ monitoring occasion) associated with the second HARQ identifier, a positive acknowledgment HARQ message (e.g., a second positive acknowledgment HARQ message); and monitor, when in the periodic evaluation mode, a subsequent HARQ monitoring occasion (e.g., a second subsequent HARQ monitoring occasion) associated with the second HARQ identifier based on receiving the second positive acknowledgment HARQ message. The first subsequent HARQ monitoring occasion may be the next HARQ monitoring occasion after the first HARQ monitoring occasion associated with the same HARQ identifier, and the second subsequent HARQ monitoring occasion may be the next HARQ monitoring occasion after the second HARQ monitoring occasion associated with the same HARQ identifier. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
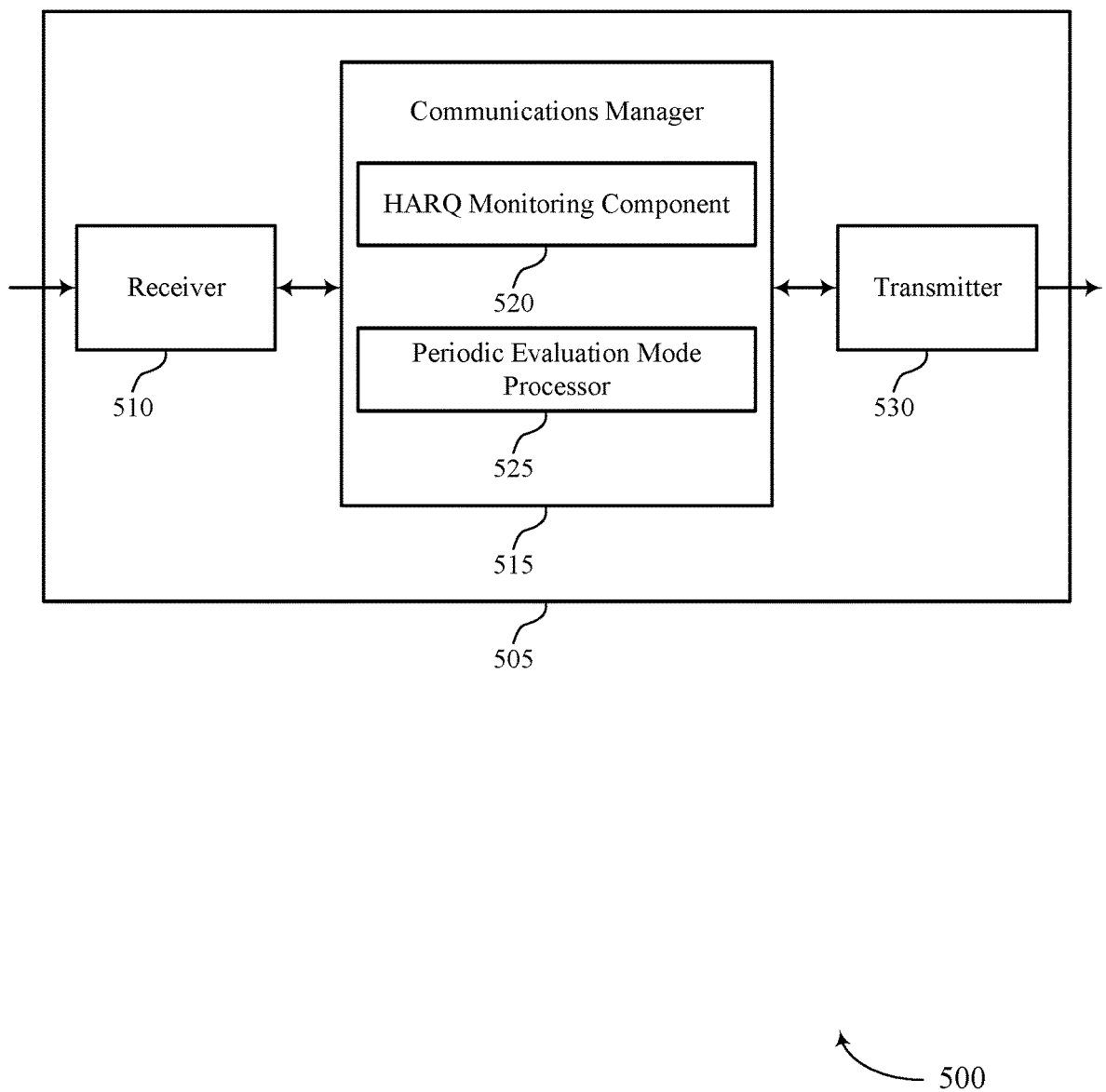

FIG. 5 shows a block diagram 500 of a device 505 that supports techniques for controlling HARQ in accordance with various aspects of the present disclosure. The device 505 may be an example of aspects of a device 405 or a UE 115 as described herein. The device 505 may include a receiver 510, a communications manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to techniques for controlling HARQ, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a HARQ monitoring component 520 and a periodic evaluation mode processor 525. Additionally, the communications manager 515 may include or be connected to a receiver 510 and a transmitter 530. The communications manager 515 may be an example of aspects of the communications manager 710 described herein.

The transmitter 530 may transmit a first uplink message corresponding to a first HARQ identifier. The receiver 510 may receive, in a first HARQ monitoring occasion associated with the first HARQ identifier, a first positive acknowledgment HARQ message. The HARQ monitoring component 520 may refrain, when in a first HARQ skipping mode, from monitoring a first subsequent HARQ monitoring occasion associated with the first HARQ identifier based on receiving the first positive acknowledgment HARQ message.

The periodic evaluation mode processor 525 may enter a periodic evaluation mode after a time threshold of operating in the first HARQ skipping mode.

The transmitter 530 may transmit a second uplink message corresponding to a second HARQ identifier. The receiver 510 may receive in a second HARQ monitoring occasion associated with the second HARQ identifier, a second positive acknowledgment HARQ message. The HARQ monitoring component 520 may monitor, when in the periodic evaluation mode, a second subsequent HARQ monitoring occasion associated with the second HARQ identifier based on receiving the second positive acknowledgment HARQ message.

The transmitter 530 may transmit signals generated by other components of the device 505. In some examples, the transmitter 530 may be collocated with a receiver 510 in a transceiver component. For example, the transmitter 530 may be an example of aspects of the transceiver 720 described with reference to FIG. 7. The transmitter 530 may utilize a single antenna or a set of antennas.

In some examples, the communications manager 515 may be implemented as an integrated circuit or chipset for a mobile device modem, and the receiver 510 and transmitter 530 may be implemented as analog components (e.g., amplifiers, filters, antennas, etc.) coupled with the mobile device modem to enable wireless transmission and reception.

The communications manager 515 as described herein may be implemented to realize one or more potential advantages. Various implementations may enable increased power savings at device 505, which may be an example of a UE 115 as described herein. At least one implementation may enable the communications manager 515 to effectively skip monitoring a subsequent HARQ monitoring occasion by returning to a sleep mode according to an aggressive HARQ skipping mode. Skipping monitoring the subsequent HARQ monitoring occasion may reduce the processing overhead at the UE 115. At least one implementation may enable communications manager 515 to dynamically adapt to changes in the wireless communications network by entering a periodic evaluation mode to assess which HARQ monitoring process should be implemented. Entering the periodic evaluation mode may allow the UE 115 to reduce a BLER associated with false ACK messages transmitted by a base station 105 (e.g., by performing a low latency switch to a baseline HARQ skipping mode).

Based on implementing the HARQ monitoring techniques as described herein, one or more processors of the device 505 (e.g., processor(s) controlling or incorporated with one or more of receiver 510, communications manager 515, and transmitter 530) may effectively reduce active time to increase battery life of the device 505. In addition, flexible adaptation to network conditions may reduce communication latency.

Figure 6:
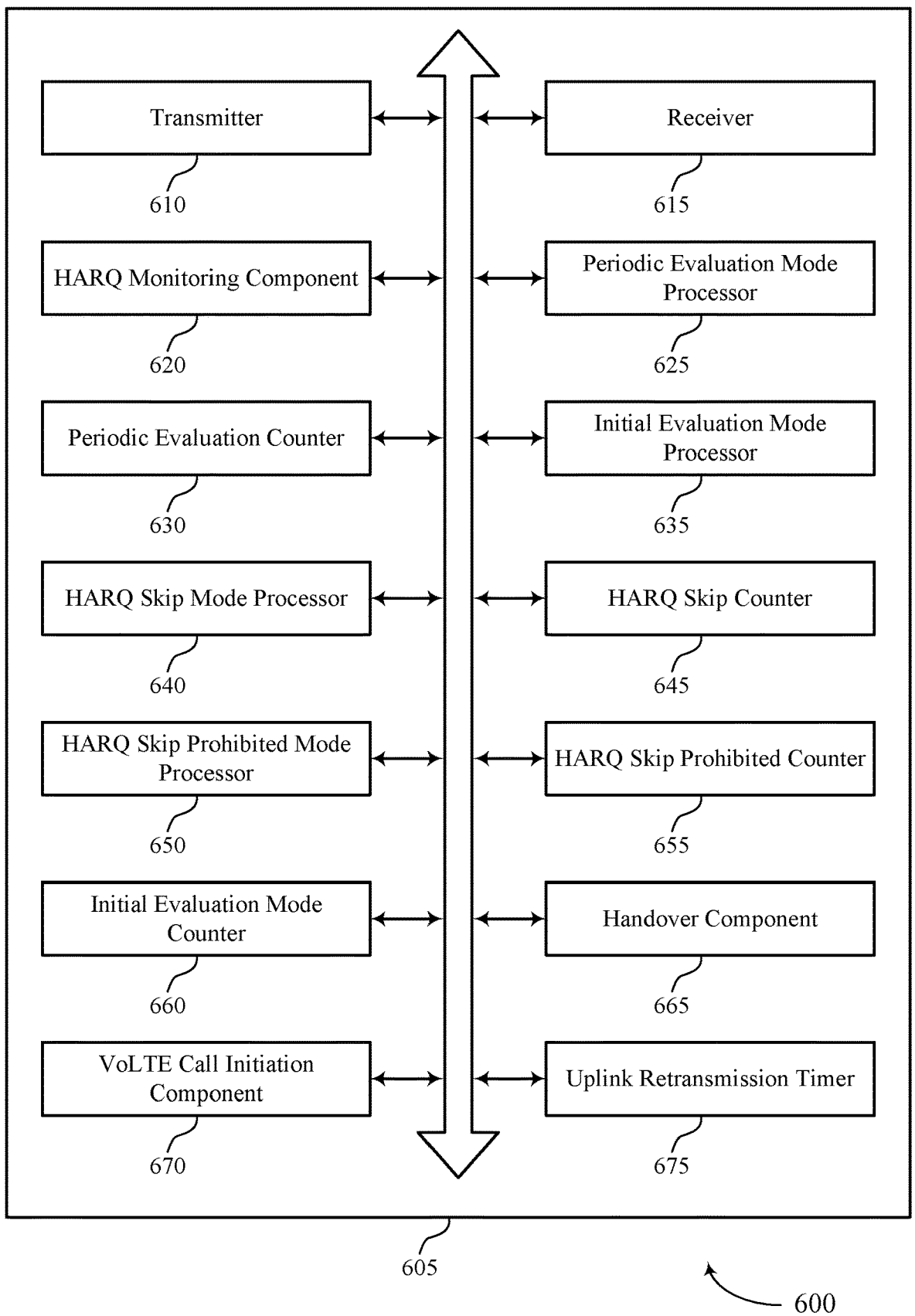
FIG. 6 shows a block diagram of a communications manager that supports techniques for controlling HARQ in accordance with various aspects of the present disclosure.

FIG. 6 shows a block diagram 600 of a communications manager 605 that supports techniques for controlling HARQ in accordance with various aspects of the present disclosure. The communications manager 605 may be an example of aspects of a communications manager 415, a communications manager 515, or a communications manager 710 described herein. The communications manager 605 may include a transmitter 610, a receiver 615, a HARQ monitoring component 620, a periodic evaluation mode processor 625, a periodic evaluation counter 630, an initial evaluation mode processor 635, a HARQ skip mode processor 640, a HARQ skip counter 645, a HARQ skip prohibited mode processor 650, a HARQ skip prohibited counter 655, an initial evaluation mode counter 660, a handover component 665, a VoLTE call initiation component 670, and an uplink retransmission timer 675. Each of these components may communicate, directly or indirectly, with one another (e.g., via one or more buses).

The transmitter 610 may transmit a first uplink message corresponding to a first HARQ identifier. The receiver 615 may receive, in a first HARQ monitoring occasion associated with the first HARQ identifier, a first positive acknowledgment HARQ message. The HARQ monitoring component 620 may refrain, when in a first HARQ skipping mode, from monitoring a first subsequent HARQ monitoring occasion associated with the first HARQ identifier based on receiving the first positive acknowledgment HARQ message.

The periodic evaluation mode processor 625 may enter a periodic evaluation mode after a time threshold of operating in the first HARQ skipping mode.

The transmitter 610 may transmit a second uplink message corresponding to a second HARQ identifier. The receiver 615 may receive, in a second HARQ monitoring occasion associated with the second HARQ identifier, a second positive acknowledgment HARQ message. The HARQ monitoring component 620 may monitor, when in the periodic evaluation mode, a second subsequent HARQ monitoring occasion associated with the second HARQ identifier based on receiving the second positive acknowledgment HARQ message.

The periodic evaluation counter 630 may initiate a periodic evaluation counter based on entering the periodic evaluation mode. The periodic evaluation mode processor 625 may operate in the periodic evaluation mode while the periodic evaluation counter is running. The HARQ skip mode processor 640 may reenter the first HARQ skipping mode based on a threshold value of the periodic evaluation counter.

The HARQ skip mode processor 640 may enter the first HARQ skipping mode. The HARQ skip counter 645 may initiate a first HARQ skipping counter based on entering the first HARQ skipping mode. The HARQ skip mode processor

640 may operate in the first HARQ skipping mode while the first HARQ skipping counter is running, where the time threshold of operating in the first HARQ skipping mode is based on a threshold value of the first HARQ skipping counter.

In some examples, the receiver 615 may receive a new uplink grant or a retransmission uplink grant in the second subsequent HARQ monitoring occasion associated with the second HARQ identifier. The HARQ skip prohibited mode processor 650 may enter a first HARQ skipping prohibited mode based on receiving the second positive acknowledgment HARQ message and receiving the new uplink grant or the retransmission uplink grant.

In some examples, the transmitter 610 may transmit a third uplink message corresponding to a third HARQ identifier. The receiver 615 may receive, in a third HARQ monitoring occasion associated with the third HARQ identifier, a third positive acknowledgment HARQ message. The HARQ monitoring component 620 may monitor, when in the first HARQ skipping prohibited mode, a third subsequent HARQ monitoring occasion associated with the third HARQ identifier based on receiving the third positive acknowledgment HARQ message.

The HARQ skip prohibited counter 655 may initiate a first HARQ skipping prohibited counter based on entering the first HARQ skipping prohibited mode. In some examples, the HARQ skip prohibited mode processor 650 may operate in the first HARQ skipping prohibited mode while the first HARQ skipping prohibited counter is running. In some examples, the initial evaluation mode processor 635 may enter an initial evaluation mode based on a threshold value of the first HARQ skipping prohibited counter.

In some examples, the receiver 615 may receive an adaptive retransmission uplink grant corresponding to a third HARQ identifier. In some examples, the receiver 615 may identify that an initial new uplink grant corresponding to the third HARQ identifier was not received. In some examples, the HARQ skip prohibited mode processor 650 may enter a first HARQ skipping prohibited mode based on the identifying.

In some examples, the initial evaluation mode processor 635 may enter an initial evaluation mode based on one or more conditions for HARQ skipping.

In some examples, the transmitter 610 may transmit a third uplink message corresponding to a third HARQ identifier. The receiver 615 may receive, in a third HARQ monitoring occasion associated with the third HARQ identifier, a third positive acknowledgment HARQ message. In some examples, the HARQ monitoring component 620 may monitor, when in the initial evaluation mode, a third subsequent HARQ monitoring occasion associated with the third HARQ identifier based on receiving the third positive acknowledgment HARQ message.

In some examples, the receiver 615 may receive a new uplink grant or a retransmission uplink grant in the third subsequent HARQ monitoring occasion associated with the third HARQ identifier. In some examples, the HARQ skip prohibited mode processor 650 may enter a first HARQ skipping prohibited mode based on receiving the third positive acknowledgment HARQ message and receiving the new uplink grant or the retransmission uplink grant.

The initial evaluation mode counter 660 may initiate at least one of an initial evaluation counter or an initial evaluation timer based on entering the initial evaluation mode. In some examples, the initial evaluation mode processor 635 may operate in the initial evaluation mode while the initial evaluation counter and/or initial evaluation timer is running. In some examples, the HARQ skip mode processor 640 may enter the first HARQ skipping mode based on a threshold value of the initial evaluation counter and/or the initial evaluation timer.

In some cases, the one or more conditions for HARQ skipping include inactive carrier aggregation, a long CDRX period, an inactivity timer shorter than an inactivity timer threshold, an on duration shorter than an on duration threshold, VoLTE call operation, absence of a background data call, a channel state feedback message associated with an uplink retransmission active time occasion, a sounding reference signal associated with an uplink retransmission active time occasion, transmission time interval bundling is not configured, or a combination thereof.

The handover component 665 may perform a handover procedure from a first base station to a second base station. In some examples, the initial evaluation mode processor 635 may enter an initial evaluation mode based on performing the handover procedure.

In some cases, the VoLTE call initiation component 670 may initiate a VoLTE call. In some examples, the initial evaluation mode processor 635 may enter an initial evaluation mode based on initiating the VoLTE call. In some examples, the periodic evaluation mode processor 625 may enter the periodic evaluation mode one or more times during a duration of the VoLTE call.

In some other cases, the VoLTE call initiation component 670 may initiate a VoLTE call. In some examples, the HARQ skip mode processor 640 may determine that one or more conditions for HARQ skipping are not met based on initiating the VoLTE call. In some examples, the initial evaluation mode processor 635 may enter an initial evaluation mode based on the one or more conditions for HARQ skipping being met during a duration of the VoLTE call.

In some examples, the HARQ skip mode processor 640 may flush a HARQ buffer for the first HARQ identifier based on operating in the first HARQ skipping mode and receiving the first positive acknowledgment HARQ message.

The uplink retransmission timer 675 may stop an uplink retransmission timer based on operating in the first HARQ skipping mode and receiving the first positive acknowledgment HARQ message.

In some examples, the HARQ monitoring component 620 may enter a low power mode based on operating in the first HARQ skipping mode and receiving the first positive acknowledgment HARQ message, where refraining from monitoring the first subsequent HARQ monitoring occasion associated with the first HARQ identifier is based on operating in the low power mode.

In some examples, monitoring the second subsequent HARQ monitoring occasion associated with the second HARQ identifier involves the HARQ skip mode processor 640 operating in a second HARQ skipping mode (e.g., a baseline HARQ skipping mode) different from the first HARQ skipping mode (e.g., an aggressive HARQ skipping mode) while operating in the periodic evaluation mode.

In some cases, the first positive acknowledgment HARQ message and the second positive acknowledgment HARQ message include PHICH ACK messages. In some cases, the first subsequent HARQ monitoring occasion associated with the first HARQ identifier is 8 subframes after the first HARQ monitoring occasion associated with the first HARQ identifier.

Figure 7:
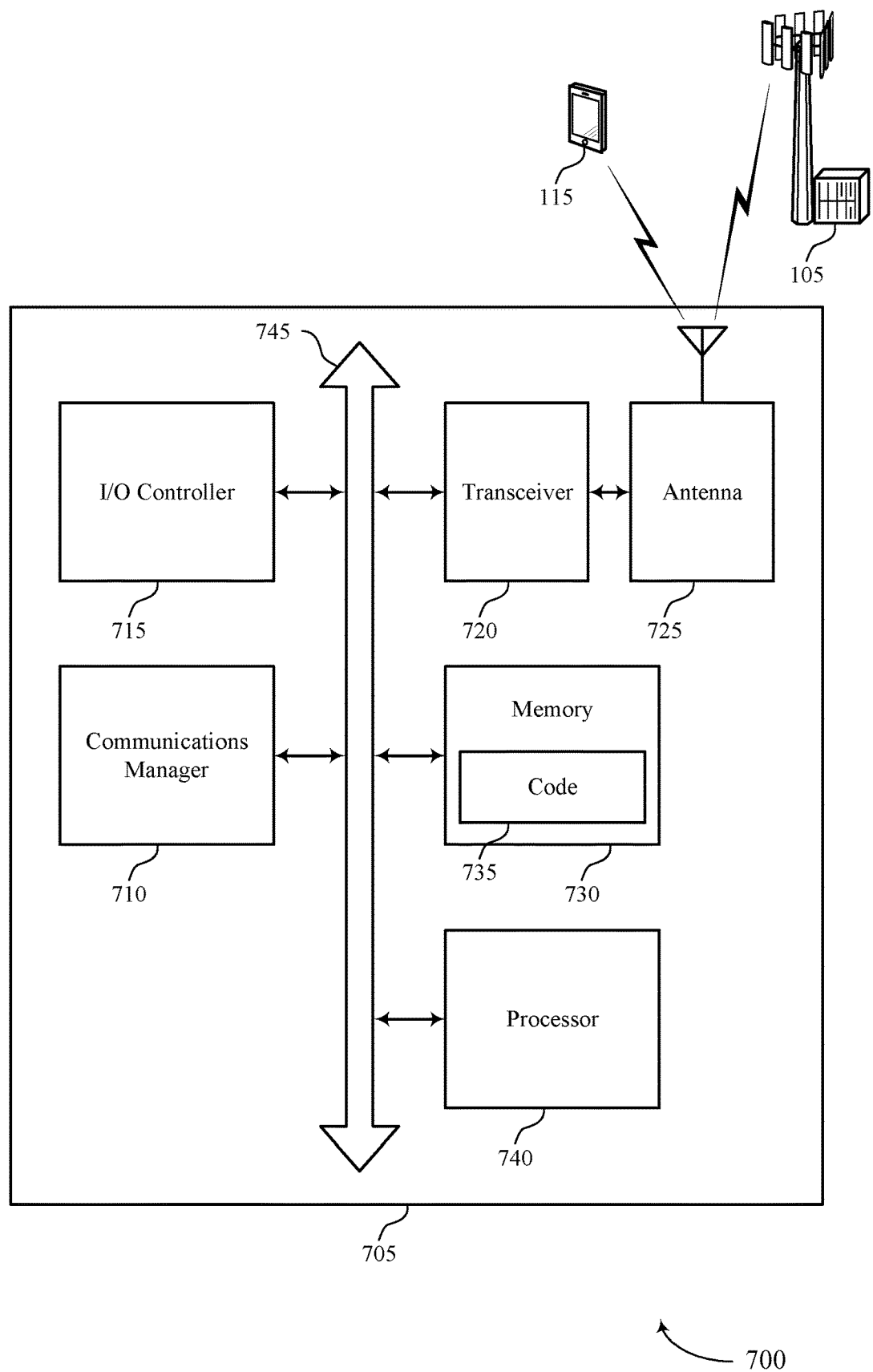
FIG. 7 shows a diagram of a system including a device that supports techniques for controlling HARQ in accordance with various aspects of the present disclosure.

FIG. 7 shows a diagram of a system 700 including a device 705 that supports techniques for controlling HARQ in accordance with various aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745). The communications manager 710 may perform the functions as described herein with reference to FIGS. 4 through 6.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described herein. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for controlling HARQ).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
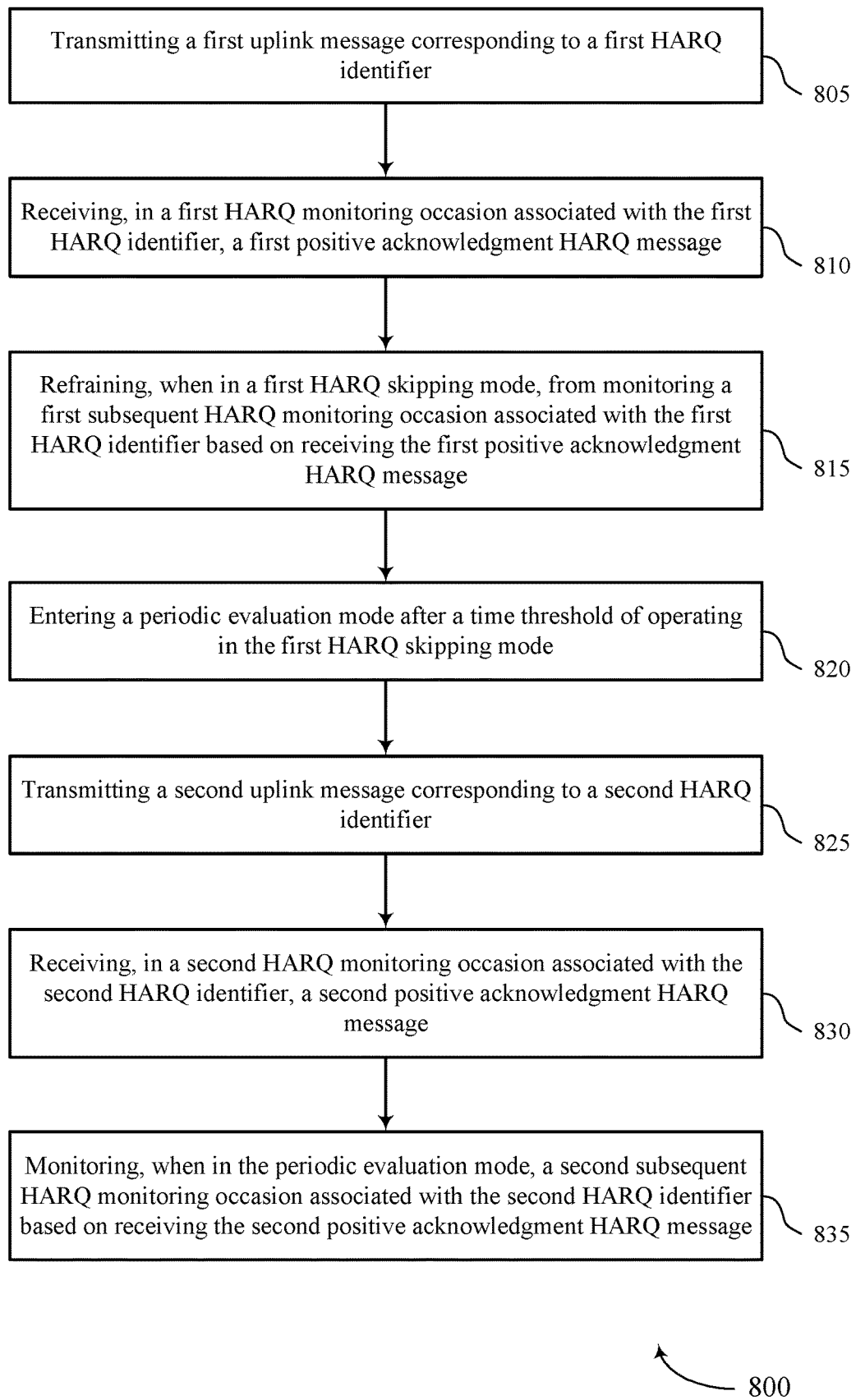
FIGS. 8 through 12 show flowcharts that support techniques for controlling HARQ in accordance with various aspects of the present disclosure.

FIG. 8 shows a flowchart that supports techniques for controlling HARQ in accordance with various aspects of the present disclosure. The operations of a method 800 may be implemented by a UE 115 or its components as described herein. For example, the operations of method 800 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 805, the UE may transmit a first uplink message corresponding to a first HARQ identifier. The operations of 805 may be performed according to the methods described herein. In some examples, aspects of the operations of 805 may be performed by a transmitter as described with reference to FIGS. 4 through 7.

At 810, the UE may receive, in a first HARQ monitoring occasion associated with the first HARQ identifier, a first positive acknowledgment HARQ message. The operations of 810 may be performed according to the methods described herein. In some examples, aspects of the operations of 810 may be performed by a receiver as described with reference to FIGS. 4 through 7.

At 815, the UE may refrain, when in a first HARQ skipping mode, from monitoring a first subsequent HARQ monitoring occasion associated with the first HARQ identifier based on receiving the first positive acknowledgment HARQ message. The operations of 815 may be performed according to the methods described herein. In some examples, aspects of the operations of 815 may be performed by a HARQ monitoring component as described with reference to FIGS. 4 through 7.

At 820, the UE may enter a periodic evaluation mode after a time threshold of operating in the first HARQ skipping mode. The operations of 820 may be performed according to the methods described herein. In some examples, aspects of the operations of 820 may be performed by a periodic evaluation mode processor as described with reference to FIGS. 4 through 7.

At 825, the UE may transmit a second uplink message corresponding to a second HARQ identifier. The operations of 825 may be performed according to the methods described herein. In some examples, aspects of the operations of 825 may be performed by a transmitter as described with reference to FIGS. 4 through 7.

At 830, the UE may receive, in a second HARQ monitoring occasion associated with the second HARQ identifier, a second positive acknowledgment HARQ message. The operations of 830 may be performed according to the methods described herein. In some examples, aspects of the operations of 830 may be performed by a receiver as described with reference to FIGS. 4 through 7.

At 835, the UE may monitor, when in the periodic evaluation mode, a second subsequent HARQ monitoring occasion associated with the second HARQ identifier based on receiving the second positive acknowledgment HARQ message. The operations of 835 may be performed according to the methods described herein. In some examples, aspects of the operations of 835 may be performed by a HARQ monitoring component as described with reference to FIGS. 4 through 7.

Figure 9:
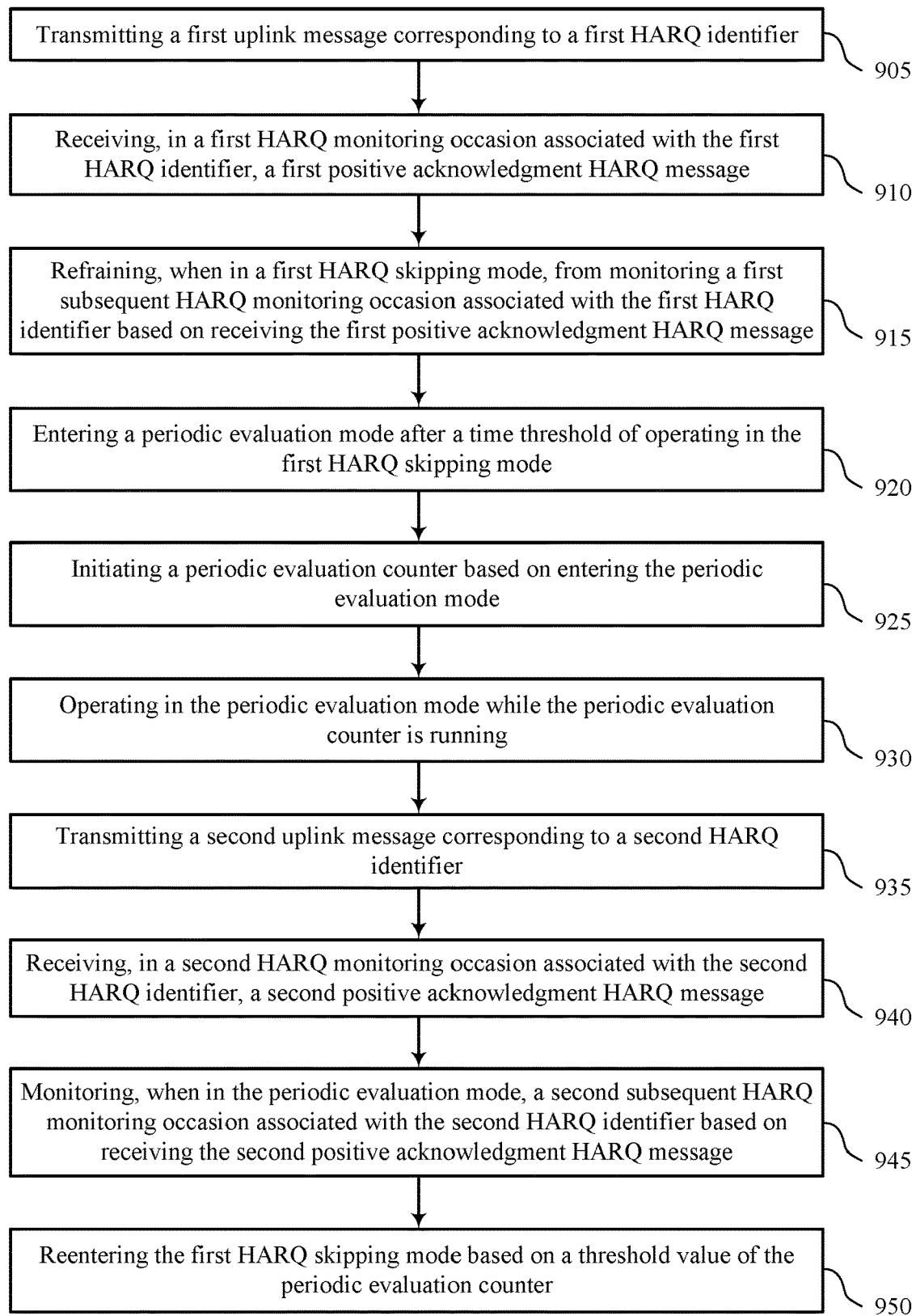

FIG. 9 shows a flowchart that supports techniques for controlling HARQ in accordance with various aspects of the present disclosure. The operations of a method 900 may be implemented by a UE 115 or its components as described herein. For example, the operations of method 900 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 905, the UE may transmit a first uplink message corresponding to a first HARQ identifier. The operations of 905 may be performed according to the methods described herein. In some examples, aspects of the operations of 905 may be performed by a transmitter as described with reference to FIGS. 4 through 7.

At 910, the UE may receive, in a first HARQ monitoring occasion associated with the first HARQ identifier, a first positive acknowledgment HARQ message. The operations of 910 may be performed according to the methods described herein. In some examples, aspects of the operations of 910 may be performed by a receiver as described with reference to FIGS. 4 through 7.

At 915, the UE may refrain, when in a first HARQ skipping mode, from monitoring a first subsequent HARQ monitoring occasion associated with the first HARQ identifier based on receiving the first positive acknowledgment HARQ message. The operations of 915 may be performed according to the methods described herein. In some examples, aspects of the operations of 915 may be performed by a HARQ monitoring component as described with reference to FIGS. 4 through 7.

At 920, the UE may enter a periodic evaluation mode after a time threshold of operating in the first HARQ skipping mode. The operations of 920 may be performed according to the methods described herein. In some examples, aspects of the operations of 920 may be performed by a periodic evaluation mode processor as described with reference to FIGS. 4 through 7.

At 925, the UE may initiate a periodic evaluation counter based on entering the periodic evaluation mode. The operations of 925 may be performed according to the methods described herein. In some examples, aspects of the operations of 925 may be performed by a periodic evaluation counter as described with reference to FIGS. 4 through 7.

At 930, the UE may operate in the periodic evaluation mode while the periodic evaluation counter is running. The operations of 930 may be performed according to the methods described herein. In some examples, aspects of the operations of 930 may be performed by an initial evaluation mode processor as described with reference to FIGS. 4 through 7.

At 935, the UE may transmit a second uplink message corresponding to a second HARQ identifier. The operations of 935 may be performed according to the methods described herein. In some examples, aspects of the operations of 935 may be performed by a transmitter as described with reference to FIGS. 4 through 7.

At 940, the UE may receive, in a second HARQ monitoring occasion associated with the second HARQ identifier, a second positive acknowledgment HARQ message. The operations of 940 may be performed according to the methods described herein. In some examples, aspects of the operations of 940 may be performed by a receiver as described with reference to FIGS. 4 through 7.

At 945, the UE may monitor, when in the periodic evaluation mode, a second subsequent HARQ monitoring occasion associated with the second HARQ identifier based on receiving the second positive acknowledgment HARQ message. The operations of 945 may be performed according to the methods described herein. In some examples, aspects of the operations of 945 may be performed by a HARQ monitoring component as described with reference to FIGS. 4 through 7.

At 950, the UE may reenter the first HARQ skipping mode based on a threshold value of the periodic evaluation counter. The operations of 950 may be performed according to the methods described herein. In some examples, aspects of the operations of 950 may be performed by a HARQ skip mode processor as described with reference to FIGS. 4 through 7.

Figure 10:
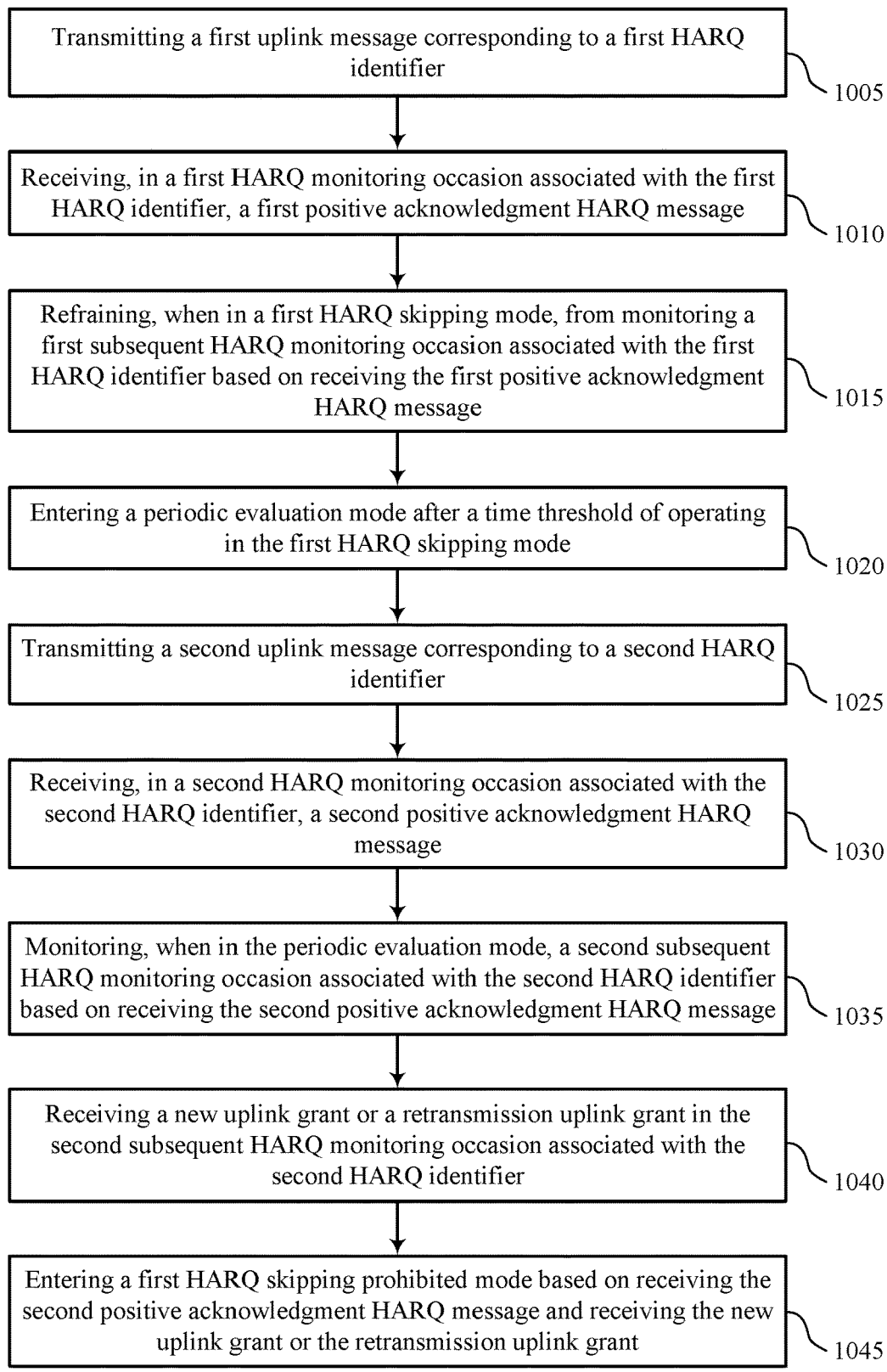

FIG. 10 shows a flowchart that supports techniques for controlling HARQ in accordance with various aspects of the present disclosure. The operations of a method 1000 may be implemented by a UE 115 or its components as described herein. For example, the operations of method 1000 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1005, the UE may transmit a first uplink message corresponding to a first HARQ identifier. The operations of 1005 may be performed according to the methods described herein. In some examples, aspects of the operations of 1005 may be performed by a transmitter as described with reference to FIGS. 4 through 7.

At 1010, the UE may receive, in a first HARQ monitoring occasion associated with the first HARQ identifier, a first positive acknowledgment HARQ message. The operations of 1010 may be performed according to the methods described herein. In some examples, aspects of the operations of 1010 may be performed by a receiver as described with reference to FIGS. 4 through 7.

At 1015, the UE may refrain, when in a first HARQ skipping mode, from monitoring a first subsequent HARQ monitoring occasion associated with the first HARQ identifier based on receiving the first positive acknowledgment HARQ message. The operations of 1015 may be performed according to the methods described herein. In some examples, aspects of the operations of 1015 may be performed by a HARQ monitoring component as described with reference to FIGS. 4 through 7.

At 1020, the UE may enter a periodic evaluation mode after a time threshold of operating in the first HARQ skipping mode. The operations of 1020 may be performed according to the methods described herein. In some examples, aspects of the operations of 1020 may be performed by a periodic evaluation mode processor as described with reference to FIGS. 4 through 7.

At 1025, the UE may transmit a second uplink message corresponding to a second HARQ identifier. The operations of 1025 may be performed according to the methods described herein. In some examples, aspects of the operations of 1025 may be performed by a transmitter as described with reference to FIGS. 4 through 7.

At 1030, the UE may receive, in a second HARQ monitoring occasion associated with the second HARQ identifier, a second positive acknowledgment HARQ message. The operations of 1030 may be performed according to the methods described herein. In some examples, aspects of the operations of 1030 may be performed by a receiver as described with reference to FIGS. 4 through 7.

At 1035, the UE may monitor, when in the periodic evaluation mode, a second subsequent HARQ monitoring occasion associated with the second HARQ identifier based on receiving the second positive acknowledgment HARQ message. The operations of 1035 may be performed according to the methods described herein. In some examples, aspects of the operations of 1035 may be performed by a HARQ monitoring component as described with reference to FIGS. 4 through 7.

At 1040, the UE may receive a new uplink grant or a retransmission uplink grant in the second subsequent HARQ monitoring occasion associated with the second HARQ identifier. The operations of 1040 may be performed according to the methods described herein. In some examples, aspects of the operations of 1040 may be performed by a receiver as described with reference to FIGS. 4 through 7.

At 1045, the UE may enter a first HARQ skipping prohibited mode based on receiving the second positive acknowledgment HARQ message and receiving the new uplink grant or the retransmission uplink grant. The operations of 1045 may be performed according to the methods described herein. In some examples, aspects of the operations of 1045 may be performed by a HARQ skip prohibited mode processor as described with reference to FIGS. 4 through 7.

Figure 11:
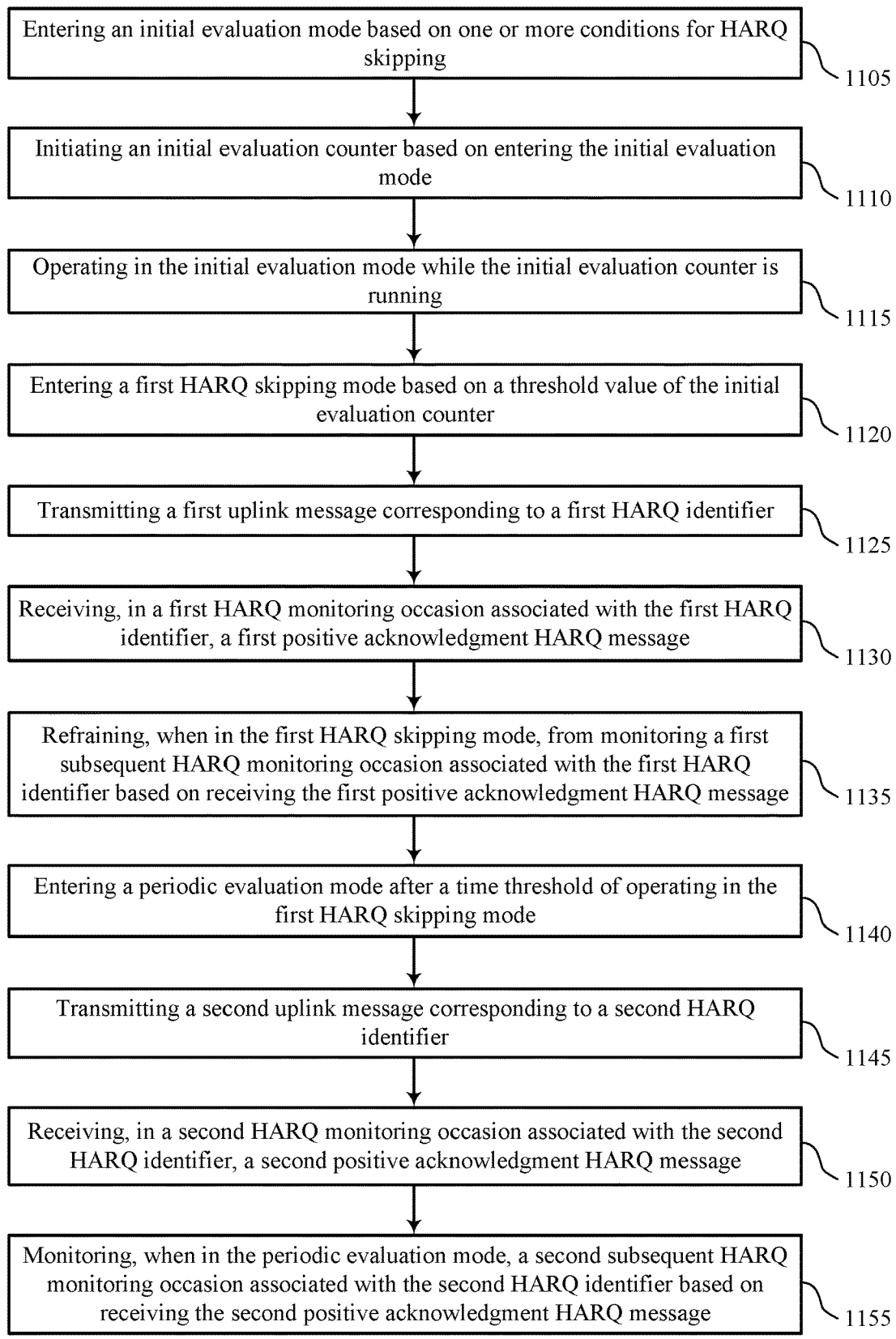

FIG. 11 shows a flowchart that supports techniques for controlling HARQ in accordance with various aspects of the present disclosure. The operations of a method 1100 may be implemented by a UE 115 or its components as described herein. For example, the operations of method 1100 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1105, the UE may enter an initial evaluation mode based on one or more conditions for HARQ skipping. The operations of 1105 may be performed according to the methods described herein. In some examples, aspects of the operations of 1105 may be performed by an initial evaluation mode processor as described with reference to FIGS. 4 through 7.

At 1110, the UE may initiate at least one of an initial evaluation counter or an initial evaluation timer based on entering the initial evaluation mode. The operations of 1110 may be performed according to the methods described herein. In some examples, aspects of the operations of 1110 may be performed by an initial evaluation mode counter and/or initial evaluation timer as described with reference to FIGS. 4 through 7.

At 1115, the UE may operate in the initial evaluation mode while the initial evaluation counter or the initial evaluation timer is running. The operations of 1115 may be performed according to the methods described herein. In some examples, aspects of the operations of 1115 may be performed by an initial evaluation mode processor as described with reference to FIGS. 4 through 7.

At 1120, the UE may enter a first HARQ skipping mode based on a threshold value of the initial evaluation counter and/or initial evaluation timer. The operations of 1120 may be performed according to the methods described herein. In some examples, aspects of the operations of 1120 may be performed by a HARQ skip mode processor as described with reference to FIGS. 4 through 7.

At 1125, the UE may transmit a first uplink message corresponding to a first HARQ identifier. The operations of 1125 may be performed according to the methods described herein. In some examples, aspects of the operations of 1125 may be performed by a transmitter as described with reference to FIGS. 4 through 7.

At 1130, the UE may receive, in a first HARQ monitoring occasion associated with the first HARQ identifier, a first positive acknowledgment HARQ message. The operations of 1130 may be performed according to the methods described herein. In some examples, aspects of the operations of 1130 may be performed by a receiver as described with reference to FIGS. 4 through 7.

At 1135, the UE may refrain, when in the first HARQ skipping mode, from monitoring a first subsequent HARQ monitoring occasion associated with the first HARQ identifier based on receiving the first positive acknowledgment HARQ message. The operations of 1135 may be performed according to the methods described herein. In some examples, aspects of the operations of 1135 may be performed by a HARQ monitoring component as described with reference to FIGS. 4 through 7.

At 1140, the UE may enter a periodic evaluation mode after a time threshold of operating in the first HARQ skipping mode. The operations of 1140 may be performed according to the methods described herein. In some examples, aspects of the operations of 1140 may be performed by a periodic evaluation mode processor as described with reference to FIGS. 4 through 7.

At 1145, the UE may transmit a second uplink message corresponding to a second HARQ identifier. The operations of 1145 may be performed according to the methods described herein. In some examples, aspects of the operations of 1145 may be performed by a transmitter as described with reference to FIGS. 4 through 7.

At 1150, the UE may receive, in a second HARQ monitoring occasion associated with the second HARQ identifier, a second positive acknowledgment HARQ message. The operations of 1150 may be performed according to the methods described herein. In some examples, aspects of the operations of 1150 may be performed by a receiver as described with reference to FIGS. 4 through 7.

At 1155, the UE may monitor, when in the periodic evaluation mode, a second subsequent HARQ monitoring occasion associated with the second HARQ identifier based on receiving the second positive acknowledgment HARQ message. The operations of 1155 may be performed according to the methods described herein. In some examples, aspects of the operations of 1155 may be performed by a HARQ monitoring component as described with reference to FIGS. 4 through 7.

Figure 12:
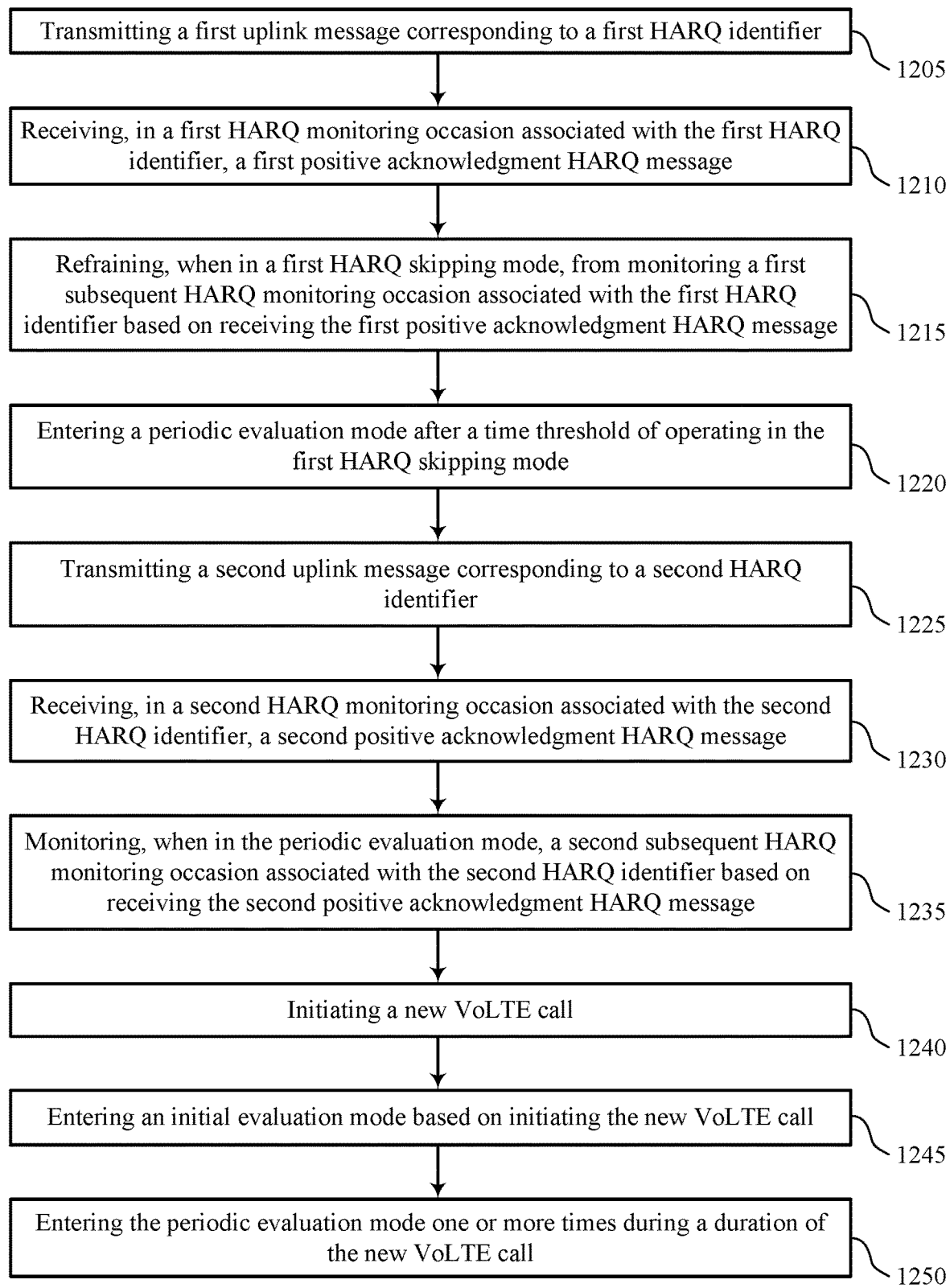

FIG. 12 shows a flowchart that supports techniques for controlling HARQ in accordance with various aspects of the present disclosure. The operations of a method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described herein. Additionally or alternatively, a UE may perform aspects of the functions described herein using special-purpose hardware.

At 1205, the UE may transmit a first uplink message corresponding to a first HARQ identifier. The operations of 1205 may be performed according to the methods described herein. In some examples, aspects of the operations of 1205 may be performed by a transmitter as described with reference to FIGS. 4 through 7.

At 1210, the UE may receive, in a first HARQ monitoring occasion associated with the first HARQ identifier, a first positive acknowledgment HARQ message. The operations of 1210 may be performed according to the methods described herein. In some examples, aspects of the operations of 1210 may be performed by a receiver as described with reference to FIGS. 4 through 7.

At 1215, the UE may refrain, when in a first HARQ skipping mode, from monitoring a first subsequent HARQ monitoring occasion associated with the first HARQ identifier based on receiving the first positive acknowledgment HARQ message. The operations of 1215 may be performed according to the methods described herein. In some examples, aspects of the operations of 1215 may be performed by a HARQ monitoring component as described with reference to FIGS. 4 through 7.

At 1220, the UE may enter a periodic evaluation mode after a time threshold of operating in the first HARQ skipping mode. The operations of 1220 may be performed according to the methods described herein. In some examples, aspects of the operations of 1220 may be performed by a periodic evaluation mode processor as described with reference to FIGS. 4 through 7.

At 1225, the UE may transmit a second uplink message corresponding to a second HARQ identifier. The operations of 1225 may be performed according to the methods described herein. In some examples, aspects of the operations of 1225 may be performed by a transmitter as described with reference to FIGS. 4 through 7.

At 1230, the UE may receive, in a second HARQ monitoring occasion associated with the second HARQ identifier, a second positive acknowledgment HARQ message. The operations of 1230 may be performed according to the methods described herein. In some examples, aspects of the operations of 1230 may be performed by a receiver as described with reference to FIGS. 4 through 7.

At 1235, the UE may monitor, when in the periodic evaluation mode, a second subsequent HARQ monitoring occasion associated with the second HARQ identifier based on receiving the second positive acknowledgment HARQ message. The operations of 1235 may be performed according to the methods described herein. In some examples, aspects of the operations of 1235 may be performed by a HARQ monitoring component as described with reference to FIGS. 4 through 7.

At 1240, the UE may initiate a new VoLTE call. The operations of 1240 may be performed according to the methods described herein. In some examples, aspects of the operations of 1240 may be performed by a VoLTE call initiation component as described with reference to FIGS. 4 through 7.

At 1245, the UE may enter an initial evaluation mode based on initiating the new VoLTE call. The operations of 1245 may be performed according to the methods described herein. In some examples, aspects of the operations of 1245 may be performed by an initial evaluation mode processor as described with reference to FIGS. 4 through 7.

At 1250, the UE may enter the periodic evaluation mode one or more times during a duration of the new VoLTE call. The operations of 1250 may be performed according to the methods described herein. In some examples, aspects of the operations of 1250 may be performed by a periodic evaluation mode processor as described with reference to FIGS. 4 through 7.

The following provides an overview of aspects of the present disclosure:

Aspect 1: A method for wireless communications at a UE, comprising: transmitting a first uplink message corresponding to a first HARQ identifier; receiving, in a first HARQ monitoring occasion associated with the first HARQ identifier, a first positive acknowledgment HARQ message; refraining, when in a first HARQ skipping mode, from monitoring a first subsequent HARQ monitoring occasion associated with the first HARQ identifier based at least in part on receiving the first positive acknowledgment HARQ message; entering a periodic evaluation mode after a time threshold of operating in the first HARQ skipping mode; transmitting a second uplink message corresponding to a second HARQ identifier; receiving, in a second HARQ monitoring occasion associated with the second HARQ identifier, a second positive acknowledgment HARQ message; and monitoring, when in the periodic evaluation mode, a second subsequent HARQ monitoring occasion associated with the second HARQ identifier based at least in part on receiving the second positive acknowledgment HARQ message.

Aspect 2: The method of aspect 1, further comprising: initiating a periodic evaluation counter based at least in part on entering the periodic evaluation mode; operating in the periodic evaluation mode while the periodic evaluation counter is running; and reentering the first HARQ skipping mode based at least in part on a threshold value of the periodic evaluation counter.

Aspect 3: The method of any of aspects 1 through 2, further comprising: entering the first HARQ skipping mode; initiating a first HARQ skipping counter based at least in part on entering the first HARQ skipping mode; and operating in the first HARQ skipping mode while the first HARQ skipping counter is running, wherein the time threshold of operating in the first HARQ skipping mode is based at least in part on a threshold value of the first HARQ skipping counter.

Aspect 4: The method of any of aspects 1 through 3, further comprising: receiving a new uplink grant or a retransmission uplink grant in the second subsequent HARQ monitoring occasion associated with the second HARQ identifier; and entering a first HARQ skipping prohibited mode based at least in part on receiving the second positive acknowledgment HARQ message and receiving the new uplink grant or the retransmission uplink grant.

Aspect 5: The method of aspect 4, further comprising: transmitting a third uplink message corresponding to a third HARQ identifier; receiving, in a third HARQ monitoring occasion associated with the third HARQ identifier, a third positive acknowledgment HARQ message; and monitoring, when in the first HARQ skipping prohibited mode, a third subsequent HARQ monitoring occasion associated with the third HARQ identifier based at least in part on receiving the third positive acknowledgment HARQ message.

Aspect 6: The method of any of aspects 4 through 5, further comprising: initiating a first HARQ skipping prohibited counter based at least in part on entering the first HARQ skipping prohibited mode; operating in the first HARQ skipping prohibited mode while the first HARQ skipping prohibited counter is running; and entering an initial evaluation mode based at least in part on a threshold value of the first HARQ skipping prohibited counter.

Aspect 7: The method of any of aspects 1 through 6, further comprising: receiving an adaptive retransmission uplink grant corresponding to a third HARQ identifier; identifying that an initial new uplink grant corresponding to the third HARQ identifier was not received; and entering a first HARQ skipping prohibited mode based at least in part on the identifying.

Aspect 8: The method of any of aspects 1 through 7, further comprising: entering an initial evaluation mode based at least in part on one or more conditions for HARQ skipping.

Aspect 9: The method of aspect 8, further comprising: transmitting a third uplink message corresponding to a third HARQ identifier; receiving, in a third HARQ monitoring occasion associated with the third HARQ identifier, a third positive acknowledgment HARQ message; and monitoring, when in the initial evaluation mode, a third subsequent HARQ monitoring occasion associated with the third HARQ identifier based at least in part on receiving the third positive acknowledgment HARQ message.

Aspect 10: The method of aspect 9, further comprising: receiving a new uplink grant or a retransmission uplink grant in the third subsequent HARQ monitoring occasion associated with the third HARQ identifier; and entering a first HARQ skipping prohibited mode based at least in part on receiving the third positive acknowledgment HARQ message and receiving the new uplink grant or the retransmission uplink grant.

Aspect 11: The method of any of aspects 8 through 10, further comprising: initiating at least one of an initial evaluation counter or an initial evaluation timer based at least in part on entering the initial evaluation mode; operating in the initial evaluation mode while the initial evaluation counter and/or the initial evaluation timer is running; and entering the first HARQ skipping mode based at least in part on a threshold value of the initial evaluation counter and/or the initial evaluation timer.

Aspect 12: The method of aspect 11, further comprising: identifying a presence of a background data call while the initial evaluation counter and/or the initial evaluation timer is running; pausing the initial evaluation counter and/or the initial evaluation timer for at least a portion of the background data call; and resuming the initial evaluation counter and/or an initial evaluation timer based at least in part on a termination of the background data call.

Aspect 13: The method of any of aspects 8 through 12, wherein the one or more conditions for HARQ skipping comprise inactive carrier aggregation, a long connected mode discontinuous reception (CDRX) period, an inactivity timer shorter than an inactivity timer threshold, an on duration shorter than an on duration threshold, voice over long term evolution (VoLTE) call operation, absence of a background data call, a channel state feedback message associated with an uplink retransmission active time occasion, a sounding reference signal associated with an uplink retransmission active time occasion, transmission time interval bundling is not configured, or a combination thereof.

Aspect 14: The method of any of aspects 8 through 13, further comprising: applying HARQ skipping based at least in part on determining that the channel state feedback message and/or the sounding reference signal is scheduled to be transmitted within the uplink retransmission active time occasion; skipping monitoring one or more uplink retransmission active time occasions before the scheduled transmission of channel state feedback message and/or the sounding reference signal; and transmitting the channel state feedback message and/or the sounding reference signal with an applicable uplink retransmission during the uplink retransmission active time occasion based at least in part on the HARQ skipping.

Aspect 15: The method of any of aspects 1 through 14, further comprising: performing a handover procedure from a first base station to a second base station; and entering an initial evaluation mode based at least in part on performing the handover procedure.

Aspect 16: The method of any of aspects 1 through 15, further comprising: initiating a voice over long term evolution (VoLTE) call; and entering an initial evaluation mode based at least in part on initiating the VoLTE call.

Aspect 17: The method of aspect 16, further comprising: entering the periodic evaluation mode one or more times during a duration of the VoLTE call.

Aspect 18: The method of any of aspects 1 through 17, further comprising: initiating a voice over long term evolution (VoLTE) call; determining that one or more conditions for HARQ skipping are met based at least in part on initiating the VoLTE call; and entering an initial evaluation mode based at least in part on the one or more conditions for HARQ skipping being met during a duration of the VoLTE call.

Aspect 19: The method of any of aspects 1 through 18, further comprising: identifying one or more transmissions during an initial evaluation mode, wherein the one or more transmissions are not associated with voice over long term evolution (VoLTE) traffic calls; and pausing the initial evaluation mode based at least in part on the identifying.

Aspect 20: The method of any of aspects 1 through 19, further comprising: flushing a HARQ buffer for the first HARQ identifier based at least in part on operating in the first HARQ skipping mode and receiving the first positive acknowledgment HARQ message.

Aspect 21: The method of any of aspects 1 through 20, further comprising: stopping an uplink retransmission timer based at least in part on operating in the first HARQ skipping mode and receiving the first positive acknowledgment HARQ message.

Aspect 22: The method of any of aspects 1 through 21, further comprising: entering a low power mode based at least in part on operating in the first HARQ skipping mode and receiving the first positive acknowledgment HARQ message, wherein refraining from monitoring the first subsequent HARQ monitoring occasion associated with the first HARQ identifier is based at least in part on operating in the low power mode.

Aspect 23: The method of any of aspects 1 through 22, wherein monitoring the second subsequent HARQ monitoring occasion associated with the second HARQ identifier comprises: operating in a second HARQ skipping mode different from the first HARQ skipping mode while operating in the periodic evaluation mode.

Aspect 24: The method of any of aspects 1 through 23, wherein the first positive acknowledgment HARQ message and the second positive acknowledgment HARQ message comprise physical channel HARQ indicator channel positive acknowledgment messages.

Aspect 25: The method of any of aspects 1 through 24, wherein the first subsequent HARQ monitoring occasion associated with the first HARQ identifier is eight subframes after the first HARQ monitoring occasion associated with the first HARQ identifier.

Aspect 26: An apparatus for wireless communications at a UE comprising a processor and memory coupled to the processor, the processor and memory configured to perform a method of any of aspects 1 through 25.

Aspect 27: An apparatus for wireless communications at a UE comprising at least one means for performing a method of any of aspects 1 through 25.

Aspect 28: A non-transitory computer-readable medium storing code for wireless communications at a UE the code comprising instructions executable by a processor to perform a method of any of aspects 1 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the present disclosure may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations described herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the present disclosure. These techniques, however, may be practiced without these specific details. In some instances, known structures and devices are shown in block diagram form in order to avoid obscuring the concepts of the present disclosure.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    transmitting a first uplink message corresponding to a first hybrid automatic repeat request (HARQ) identifier;
    receiving, in a first HARQ monitoring occasion associated with the first HARQ identifier, a first positive acknowledgment HARQ message;
    refraining, when in a first HARQ skipping mode, from monitoring a first subsequent HARQ monitoring occasion associated with the first HARQ identifier based at least in part on receiving the first positive acknowledgment HARQ message;
    entering a periodic evaluation mode after a time threshold of operating in the first HARQ skipping mode;
    initiating a periodic evaluation counter based at least in part on entering the periodic evaluation mode;
    transmitting a second uplink message corresponding to a second HARQ identifier;
    receiving, in a second HARQ monitoring occasion associated with the second HARQ identifier, a second positive acknowledgment HARQ message;
    monitoring, when in the periodic evaluation mode, a second subsequent HARQ monitoring occasion associated with the second HARQ identifier based at least in part on receiving the second positive acknowledgment HARQ message; and
    reentering the first HARQ skipping mode based at least in part on a threshold value of the periodic evaluation counter.

2. The method of claim 1, further comprising:
    entering the first HARQ skipping mode;
    initiating a first HARQ skipping counter based at least in part on entering the first HARQ skipping mode; and
    operating in the first HARQ skipping mode while the first HARQ skipping counter is running, wherein the time threshold of operating in the first HARQ skipping mode is based at least in part on a threshold value of the first HARQ skipping counter.

3. The method of claim 1, further comprising:
    receiving a new uplink grant or a retransmission uplink grant in the second subsequent HARQ monitoring occasion associated with the second HARQ identifier; and
    entering a first HARQ skipping prohibited mode based at least in part on receiving the second positive acknowledgment HARQ message and receiving the new uplink grant or the retransmission uplink grant.

4. The method of claim 3, further comprising:
    transmitting a third uplink message corresponding to a third HARQ identifier;
    receiving, in a third HARQ monitoring occasion associated with the third HARQ identifier, a third positive acknowledgment HARQ message; and
    monitoring, when in the first HARQ skipping prohibited mode, a third subsequent HARQ monitoring occasion associated with the third HARQ identifier based at least in part on receiving the third positive acknowledgment HARQ message.

5. The method of claim 3, further comprising:
    initiating a first HARQ skipping prohibited counter based at least in part on entering the first HARQ skipping prohibited mode;
    operating in the first HARQ skipping prohibited mode while the first HARQ skipping prohibited counter is running; and
    entering an initial evaluation mode based at least in part on a threshold value of the first HARQ skipping prohibited counter.

6. The method of claim 1, further comprising:
    receiving an adaptive retransmission uplink grant corresponding to a third HARQ identifier;
    identifying that an initial new uplink grant corresponding to the third HARQ identifier was not received; and
    entering a first HARQ skipping prohibited mode based at least in part on the identifying.

7. The method of claim 1, further comprising:
    entering an initial evaluation mode based at least in part on one or more conditions for HARQ skipping.

8. The method of claim 7, further comprising:
    transmitting a third uplink message corresponding to a third HARQ identifier;
    receiving, in a third HARQ monitoring occasion associated with the third HARQ identifier, a third positive acknowledgment HARQ message; and
    monitoring, when in the initial evaluation mode, a third subsequent HARQ monitoring occasion associated with the third HARQ identifier based at least in part on receiving the third positive acknowledgment HARQ message.

9. The method of claim 8, further comprising:
    receiving a new uplink grant or a retransmission uplink grant in the third subsequent HARQ monitoring occasion associated with the third HARQ identifier; and
    entering a first HARQ skipping prohibited mode based at least in part on receiving the third positive acknowledgment HARQ message and receiving the new uplink grant or the retransmission uplink grant.

10. The method of claim 7, further comprising:
    initiating at least one of an initial evaluation counter or an initial evaluation timer based at least in part on entering the initial evaluation mode;
    operating in the initial evaluation mode while the initial evaluation counter or the initial evaluation timer is running; and
    entering the first HARQ skipping mode based at least in part on a threshold value of the initial evaluation counter or the initial evaluation timer.

11. The method of claim 10, further comprising:
    identifying a presence of a background data call while the initial evaluation counter or the initial evaluation timer is running;
    pausing the initial evaluation counter or the initial evaluation timer for at least a portion of the background data call; and
    resuming the initial evaluation counter or an initial evaluation timer based at least in part on a termination of the background data call.

12. The method of claim 7, wherein the one or more conditions for HARQ skipping comprise inactive carrier aggregation, a long connected mode discontinuous reception (CDRX) period, an inactivity timer shorter than an inactivity timer threshold, an on duration shorter than an on duration threshold, voice over long term evolution (VoLTE) call operation, absence of a background data call, a channel state feedback message associated with an uplink retransmission active time occasion, a sounding reference signal associated with the uplink retransmission active time occasion, transmission time interval bundling is not configured, or a combination thereof.

13. The method of claim 7, further comprising:
applying HARQ skipping based at least in part on determining that a channel state feedback message and/or a sounding reference signal is scheduled to be transmitted within an uplink retransmission active time occasion;
skipping monitoring one or more uplink retransmission active time occasions before transmission of the channel state feedback message and/or the sounding reference signal; and
transmitting the channel state feedback message and/or the sounding reference signal with an applicable uplink retransmission during the uplink retransmission active time occasion based at least in part on the HARQ skipping.

14. The method of claim 1, further comprising:
performing a handover procedure from a first base station to a second base station; and
entering an initial evaluation mode based at least in part on performing the handover procedure.

15. The method of claim 1, further comprising:
initiating a voice over long term evolution (VoLTE) call; and
entering an initial evaluation mode based at least in part on initiating the VoLTE call.

16. The method of claim 15, further comprising:
entering the periodic evaluation mode one or more times during a duration of the VoLTE call.

17. The method of claim 1, further comprising:
initiating a voice over long term evolution (VoLTE) call;
determining that one or more conditions for HARQ skipping are not met based at least in part on initiating the VoLTE call; and
entering an initial evaluation mode based at least in part on the one or more conditions for HARQ skipping being met during a duration of the VoLTE call.

18. The method of claim 1, further comprising:
identifying one or more transmissions during an initial evaluation mode, wherein the one or more transmissions are not associated with voice over long term evolution (VoLTE) traffic calls; and
pausing the initial evaluation mode based at least in part on the identifying.

19. The method of claim 1, further comprising:
flushing a HARQ buffer for the first HARQ identifier based at least in part on operating in the first HARQ skipping mode and receiving the first positive acknowledgment HARQ message.

20. The method of claim 1, further comprising:
stopping an uplink retransmission timer based at least in part on operating in the first HARQ skipping mode and receiving the first positive acknowledgment HARQ message.

21. The method of claim 1, further comprising:
entering a low power mode based at least in part on operating in the first HARQ skipping mode and receiving the first positive acknowledgment HARQ message, wherein refraining from monitoring the first subsequent HARQ monitoring occasion associated with the first HARQ identifier is based at least in part on operating in the low power mode.

22. The method of claim 1, wherein monitoring the second subsequent HARQ monitoring occasion associated with the second HARQ identifier comprises:
operating in a second HARQ skipping mode different from the first HARQ skipping mode while operating in the periodic evaluation mode.

23. The method of claim 1, wherein the first positive acknowledgment HARQ message and the second positive acknowledgment HARQ message comprise physical channel HARQ indicator channel positive acknowledgment messages.

24. The method of claim 1, wherein the first subsequent HARQ monitoring occasion associated with the first HARQ identifier is eight subframes after the first HARQ monitoring occasion associated with the first HARQ identifier.

25. An apparatus for wireless communications at a user equipment (UE), comprising:
a processor;
memory coupled with the processor; and
instructions stored in the memory and executable by the processor to cause the apparatus to:
transmit a first uplink message corresponding to a first hybrid automatic repeat request (HARQ) identifier;
receive, in a first HARQ monitoring occasion associated with the first HARQ identifier, a first positive acknowledgment HARQ message;
refrain, when in a first HARQ skipping mode, from monitoring a first subsequent HARQ monitoring occasion associated with the first HARQ identifier based at least in part on receiving the first positive acknowledgment HARQ message;
enter a periodic evaluation mode after a time threshold of operating in the first HARQ skipping mode;
initiate a periodic evaluation counter based at least in part on entering the periodic evaluation mode;
transmit a second uplink message corresponding to a second HARQ identifier;
receive, in a second HARQ monitoring occasion associated with the second HARQ identifier, a second positive acknowledgment HARQ message;
monitor, when in the periodic evaluation mode, a second subsequent HARQ monitoring occasion associated with the second HARQ identifier based at least in part on receiving the second positive acknowledgment HARQ message; and
reenter the first HARQ skipping mode based at least in part on a threshold value of the periodic evaluation counter.

26. The apparatus of claim 25, wherein the instructions are further executable by the processor to cause the apparatus to:
enter the first HARQ skipping mode;
initiate a first HARQ skipping counter based at least in part on entering the first HARQ skipping mode; and
operate in the first HARQ skipping mode while the first HARQ skipping counter is running, wherein the time threshold of operating in the first HARQ skipping mode is based at least in part on a threshold value of the first HARQ skipping counter.

27. An apparatus for wireless communications at a user equipment (UE), comprising:
means for transmitting a first uplink message corresponding to a first hybrid automatic repeat request (HARQ) identifier;
means for receiving, in a first HARQ monitoring occasion associated with the first HARQ identifier, a first positive acknowledgment HARQ message;
means for refraining, when in a first HARQ skipping mode, from monitoring a first subsequent HARQ monitoring occasion associated with the first HARQ identifier based at least in part on receiving the first positive acknowledgment HARQ message;

means for entering a periodic evaluation mode after a time threshold of operating in the first HARQ skipping mode;
means for initiating a periodic evaluation counter based at least in part on entering the periodic evaluation mode;
means for transmitting a second uplink message corresponding to a second HARQ identifier;
means for receiving, in a second HARQ monitoring occasion associated with the second HARQ identifier, a second positive acknowledgment HARQ message;
means for monitoring, when in the periodic evaluation mode, a second subsequent HARQ monitoring occasion associated with the second HARQ identifier based at least in part on receiving the second positive acknowledgment HARQ message; and
means for reentering the first HARQ skipping mode based at least in part on a threshold value of the periodic evaluation counter.

28. A non-transitory computer-readable medium storing code for wireless communications at a user equipment (UE), the code comprising instructions executable by a processor to:
transmit a first uplink message corresponding to a first hybrid automatic repeat request (HARQ) identifier;
receive, in a first HARQ monitoring occasion associated with the first HARQ identifier, a first positive acknowledgment HARQ message;
refrain, when in a first HARQ skipping mode, from monitoring a first subsequent HARQ monitoring occasion associated with the first HARQ identifier based at least in part on receiving the first positive acknowledgment HARQ message;
enter a periodic evaluation mode after a time threshold of operating in the first HARQ skipping mode;
initiate a periodic evaluation counter based at least in part on entering the periodic evaluation mode;
transmit a second uplink message corresponding to a second HARQ identifier;
receive, in a second HARQ monitoring occasion associated with the second HARQ identifier, a second positive acknowledgment HARQ message;
monitor, when in the periodic evaluation mode, a second subsequent HARQ monitoring occasion associated with the second HARQ identifier based at least in part on receiving the second positive acknowledgment HARQ message; and
reenter the first HARQ skipping mode based at least in part on a threshold value of the periodic evaluation counter.

* * * * *